United States Patent [19]
Robb

[11] Patent Number: 5,532,880
[45] Date of Patent: Jul. 2, 1996

[54] LASER BEAM EXPANDERS

[75] Inventor: Paul N. Robb, Sunnyvale, Calif.

[73] Assignee: Lockhead Missiles & Space Company, Inc., Sunnyvale, Calif.

[21] Appl. No.: 269,576

[22] Filed: Jul. 1, 1994

[51] Int. Cl.[6] .................................................. G02B 1/06
[52] U.S. Cl. ................................................. 359/665
[58] Field of Search .................................. 359/665, 666

[56]  References Cited

U.S. PATENT DOCUMENTS

| | | | |
|---|---|---|---|
| 4,932,762 | 6/1990 | Robb | 359/665 |
| 4,958,919 | 9/1990 | Sigler | 359/665 |
| 5,033,831 | 7/1991 | Sigler | 359/665 |
| 5,345,337 | 9/1994 | Sigler | 359/665 |
| 5,373,396 | 12/1994 | Robb | 359/665 |
| 5,384,657 | 1/1995 | Robb | 359/665 |
| 5,446,591 | 8/1995 | Medlock | 359/665 |

OTHER PUBLICATIONS

Li, H. H., "Refractive Index of Alkali Halides and Its Wavelength and Temperature Derivatives", *J. Phys. Chem. Ref. Data*, vol. 5, No. 2, 1976, pp. 332–360, 436–448.

Li, H. H., "Refractive Index of Alkali Halides and Its Wavelength and Temperature Derivatives", *J. Phys. Chem. Ref. Data*, vol. 9, No. 1, 1980, pp. 163–175, 226–246.

Robb, Paul N., "Selection of Optical Glasses", *Proceedings of the International Lens Design Conference*, Cherry, Hill, New Jersey, vol. 554, 10–23 Jun. 1985, pp. 60–75.

Robb, Paul N., "Commercial Applications of Liquid Optical Elements", *Proceedings of Passive Materials for Optical Lens Elements II*, San Diego, California, vol. 2018, 14–15 Jul. 1993, pp. 216–223.

*Primary Examiner*—Georgia Y. Epps
*Assistant Examiner*—Evelyn A. Lester
*Attorney, Agent, or Firm*—J. P. Violette; Edward J. Radlo

[57]  ABSTRACT

A lens system (10) for a 5X laser beam expander includes lens elements (11, 12, 13, 14) which consist of crystalline and liquid optical materials. Several embodiments, using different materials for the lens elements (11, 12, 13, 14), provide diffraction-limited performance without refocussing over several wavelength ranges, the broadest being from 0.24 to 2.5 microns.

45 Claims, 18 Drawing Sheets

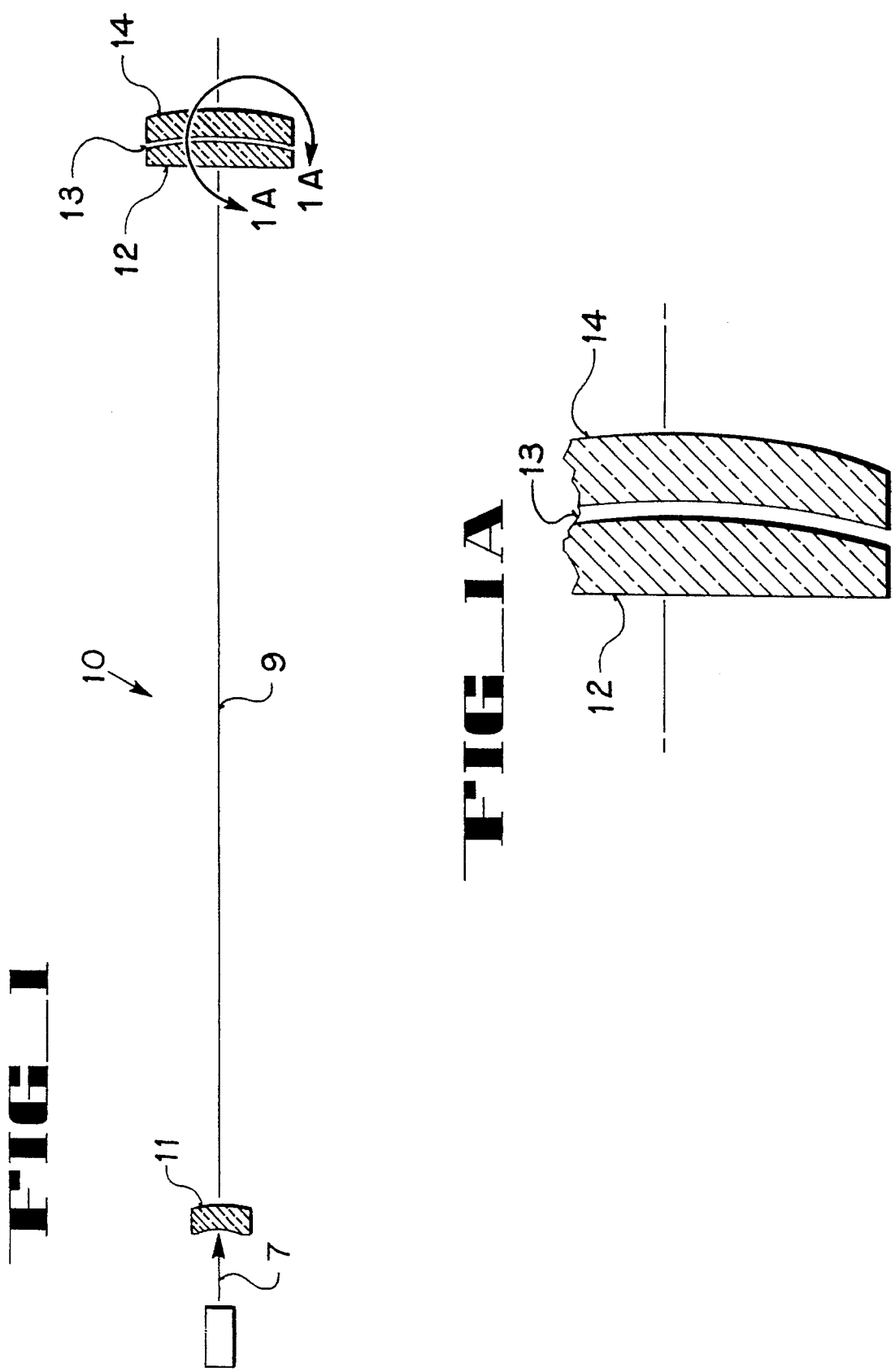

FIG_2
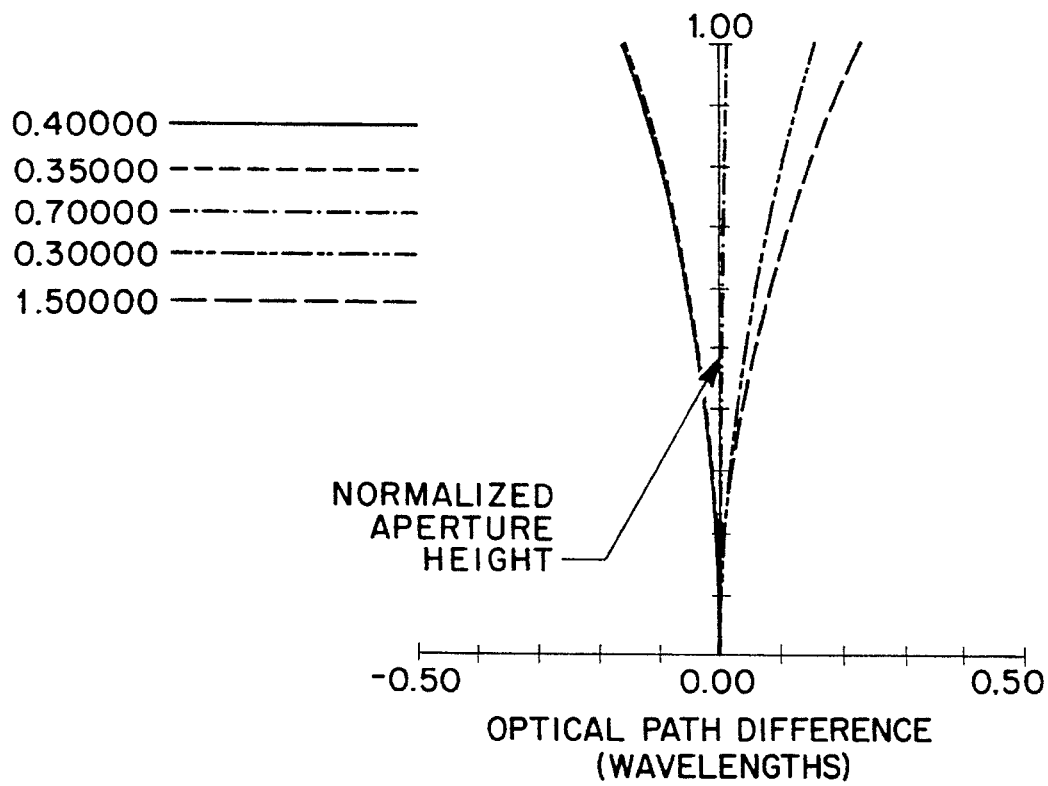
0.40000 ———
0.35000 – – –
0.70000 –·–·–
0.30000 –··–··–
1.50000 – – –
FIG_3
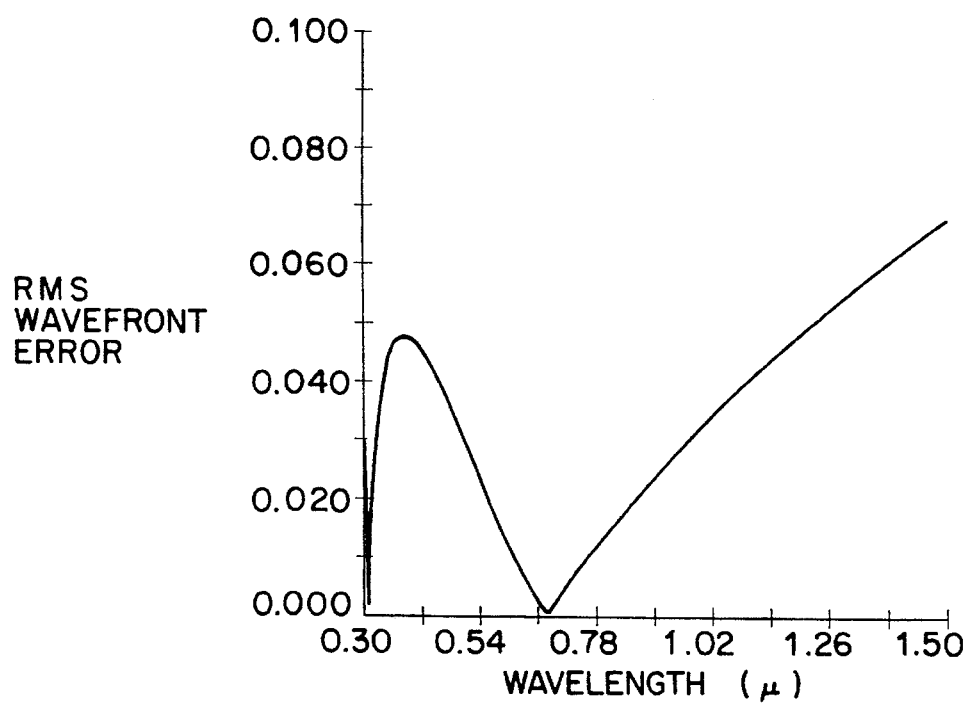

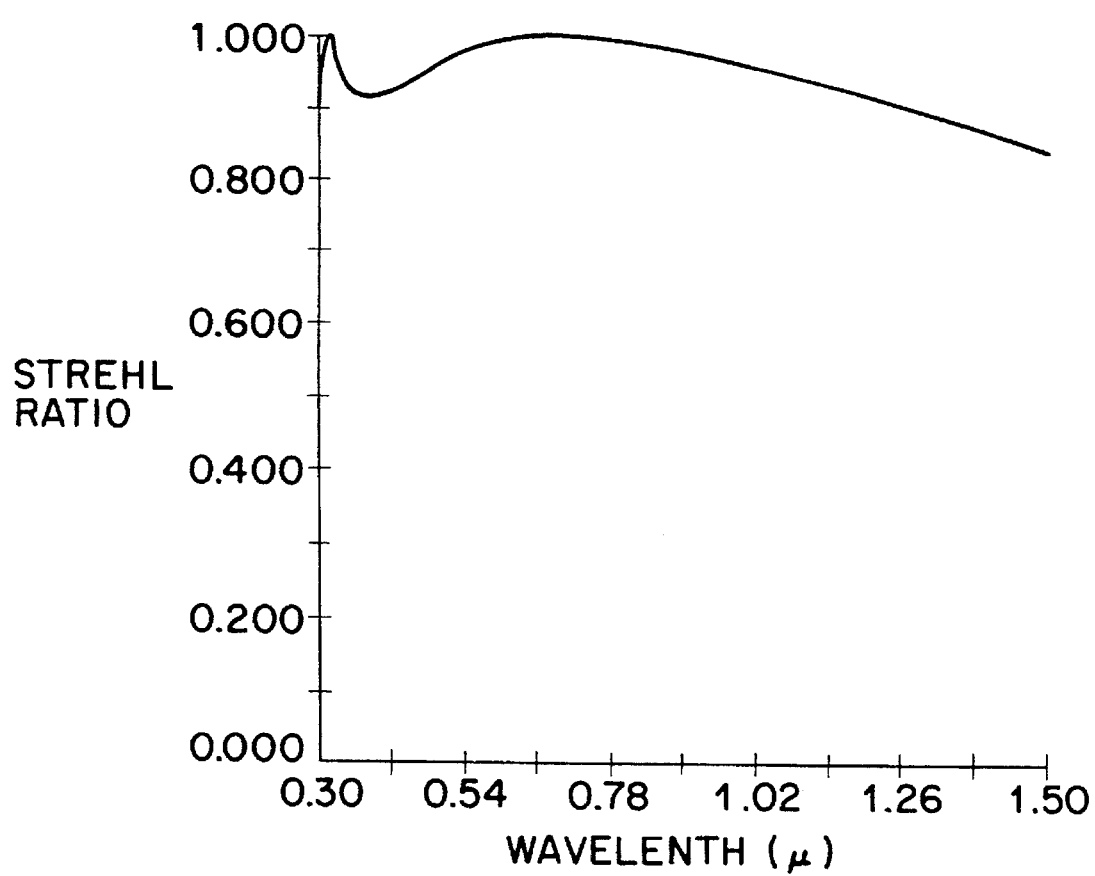
FIG_4

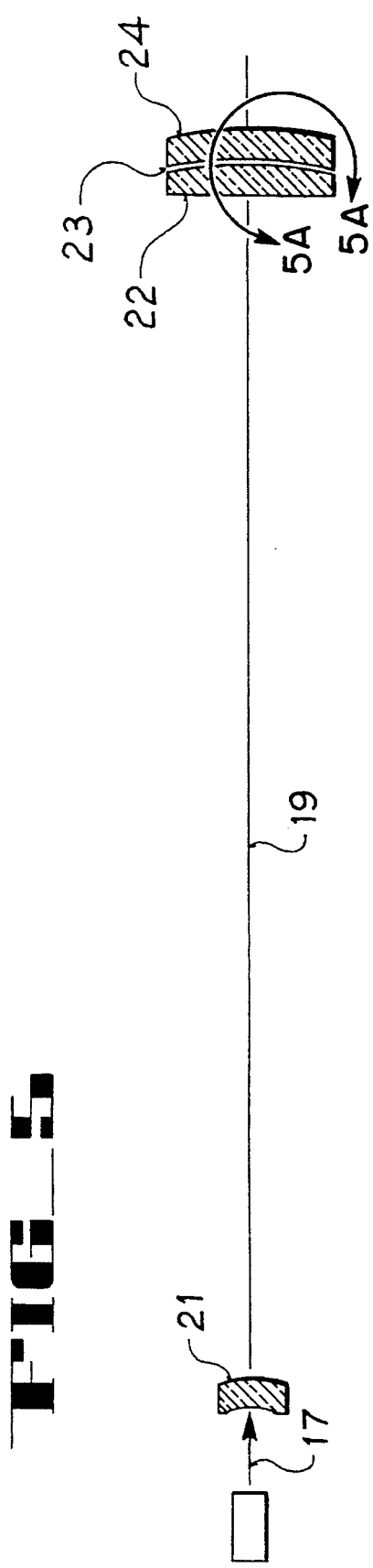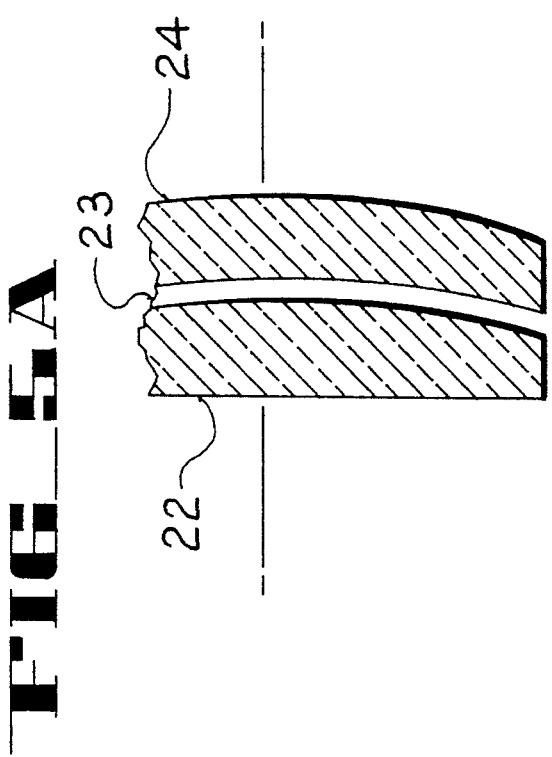

FIG_6
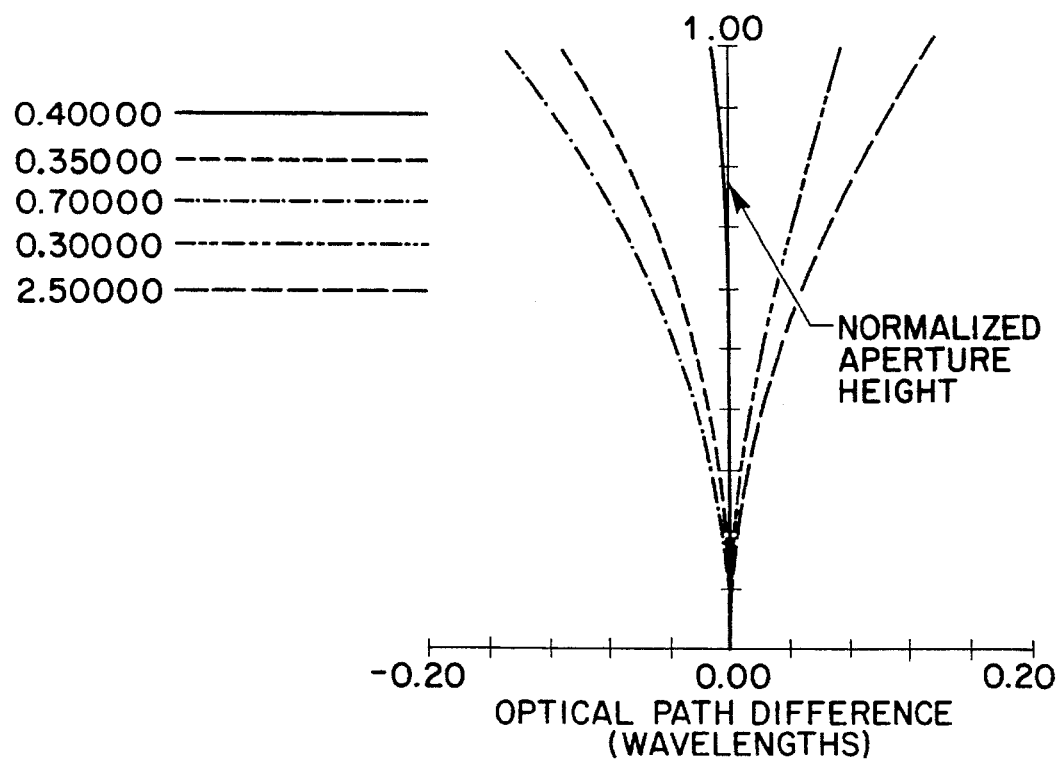
FIG_7
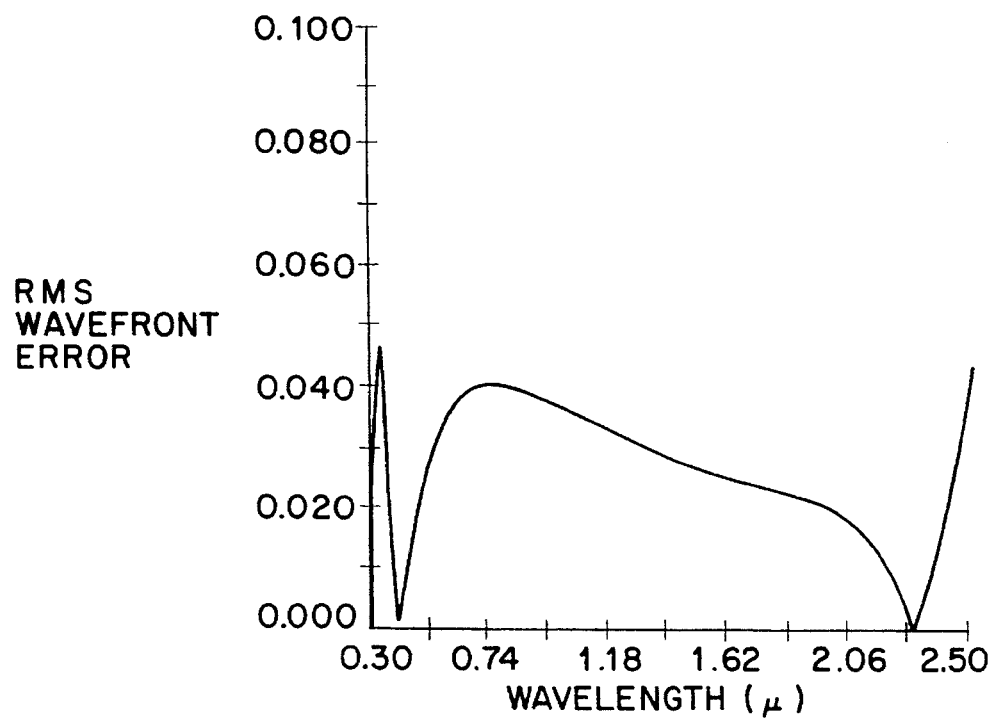

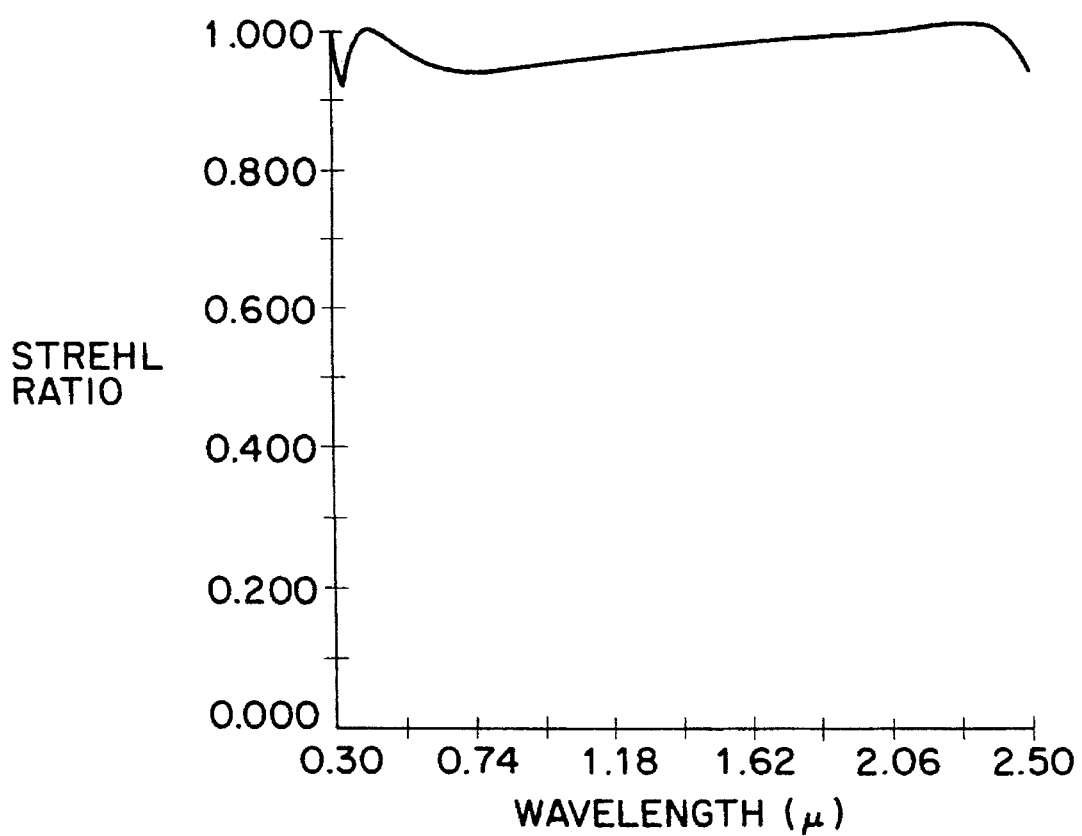

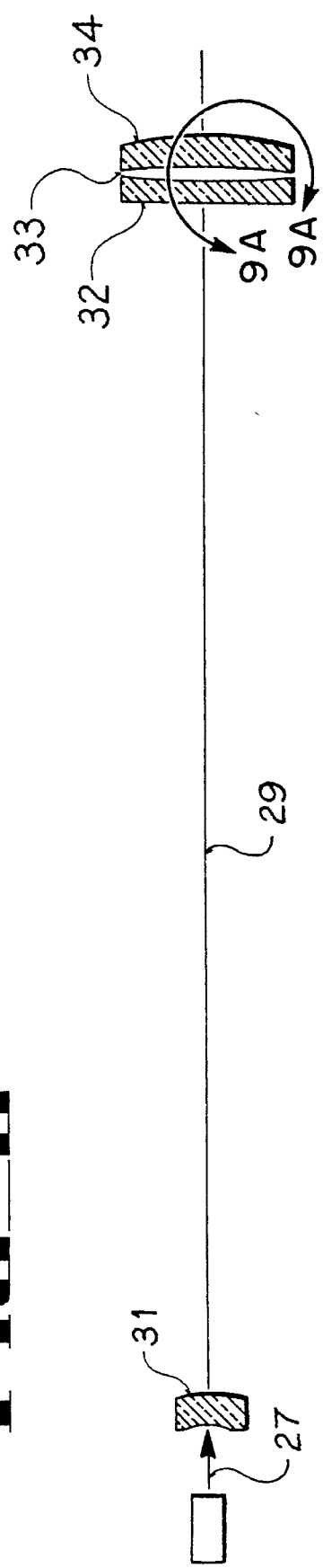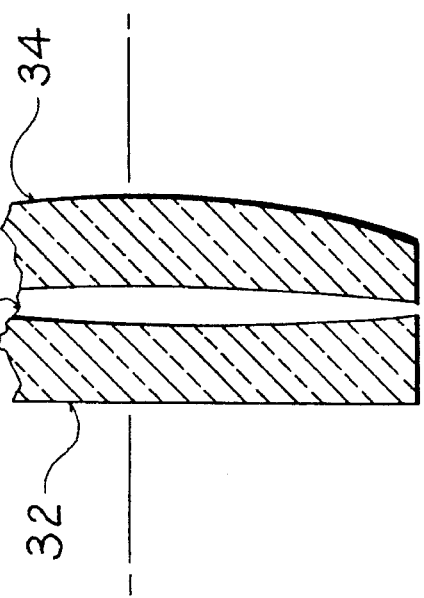

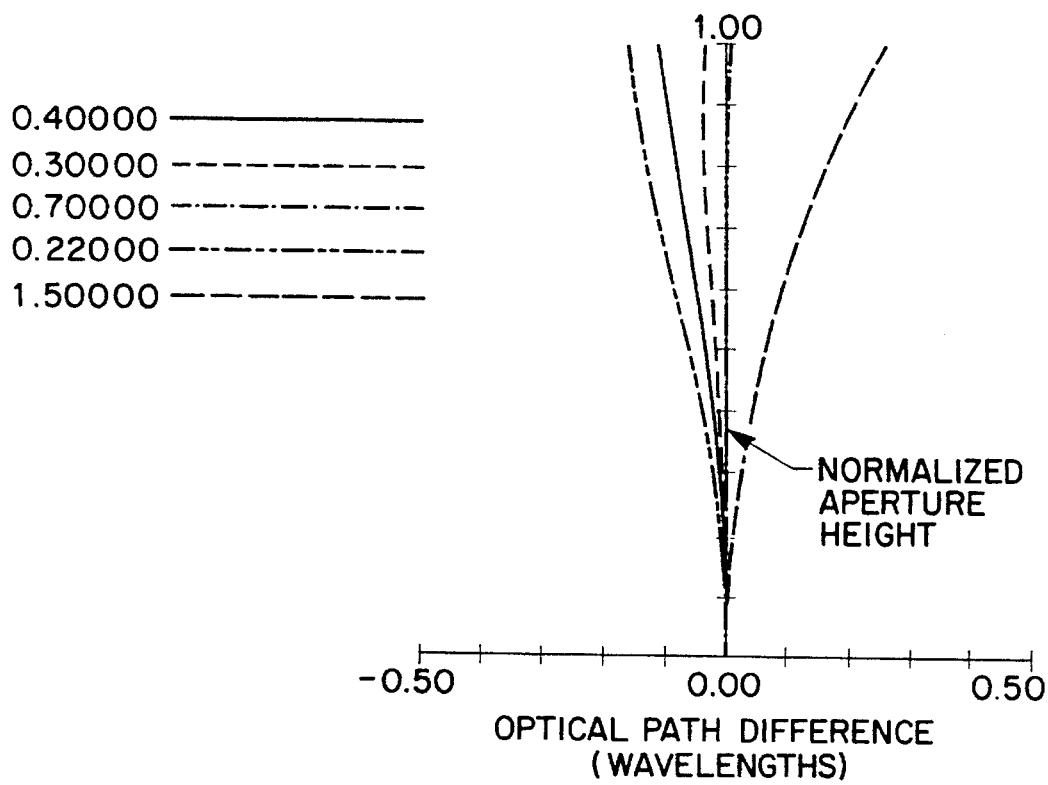
FIG_10
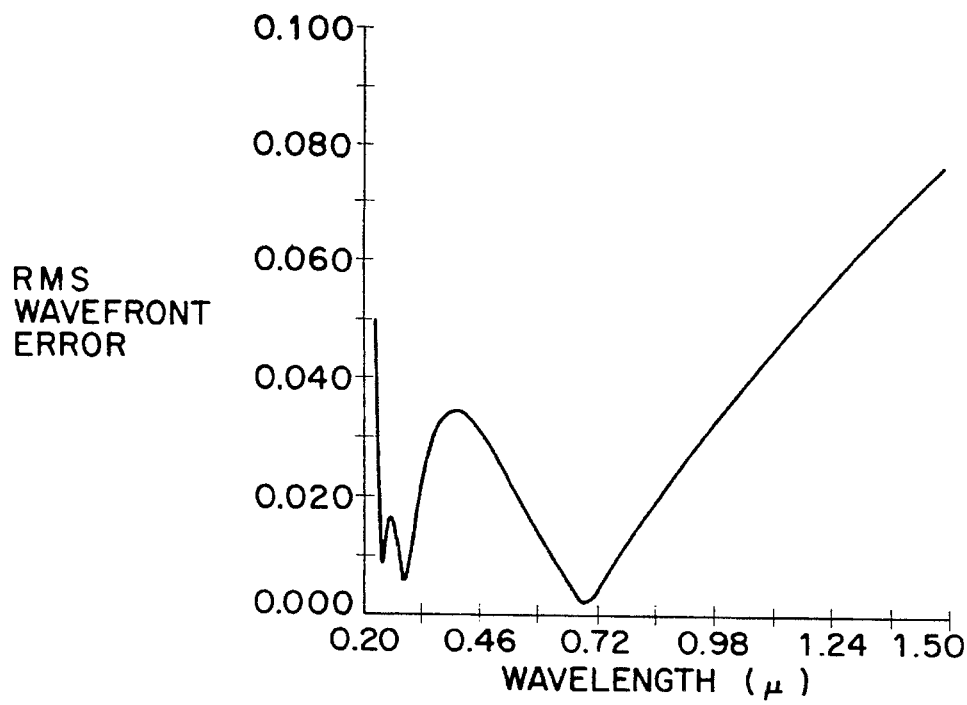
FIG_11

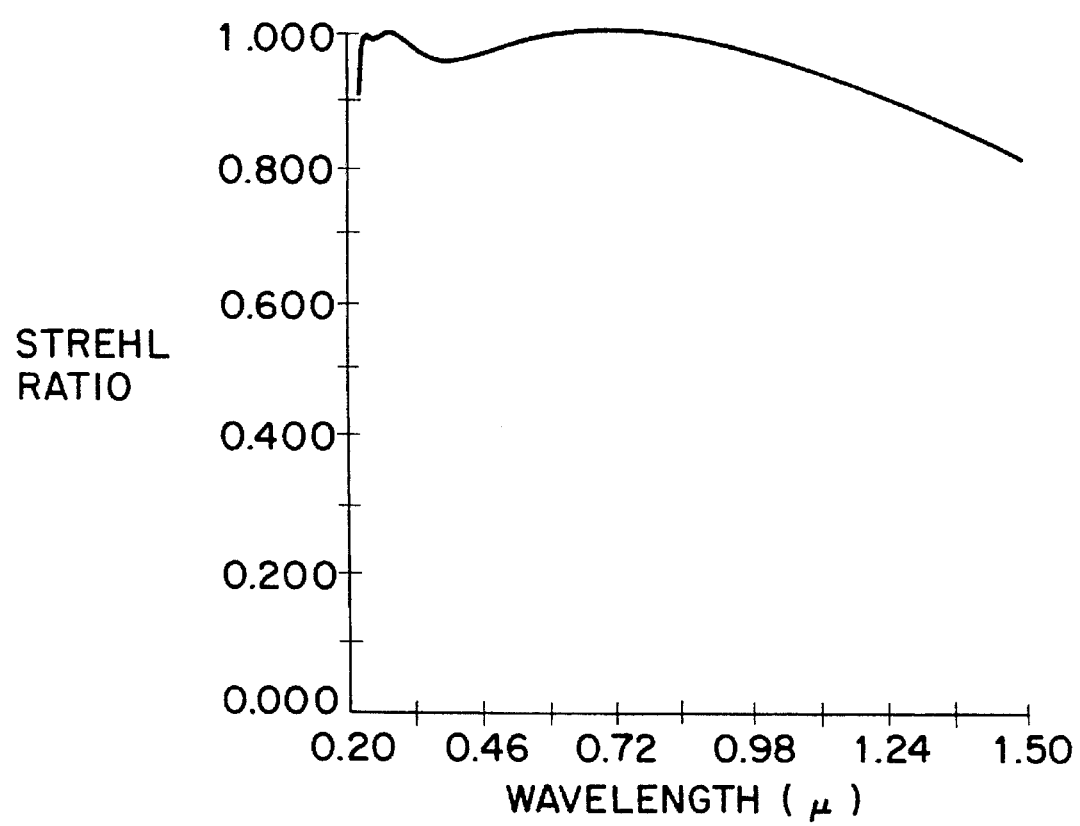
FIG_12

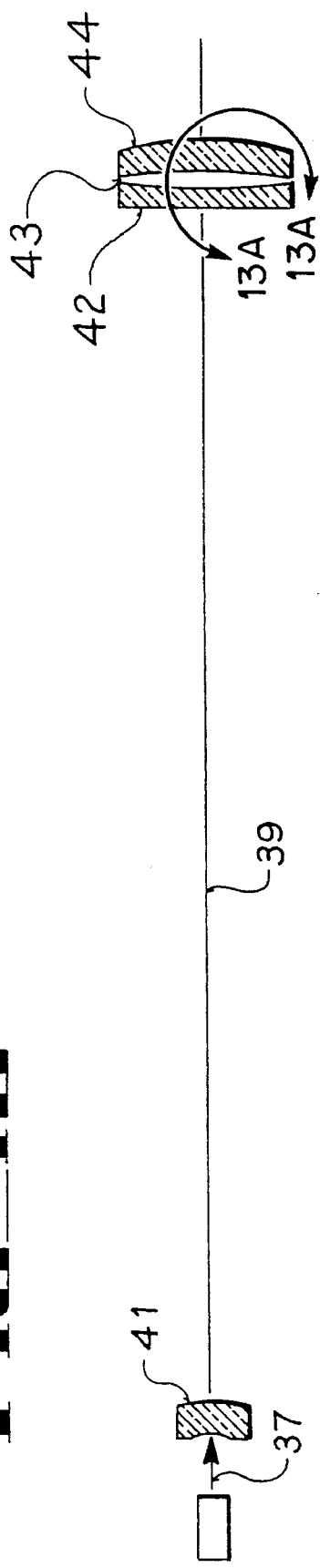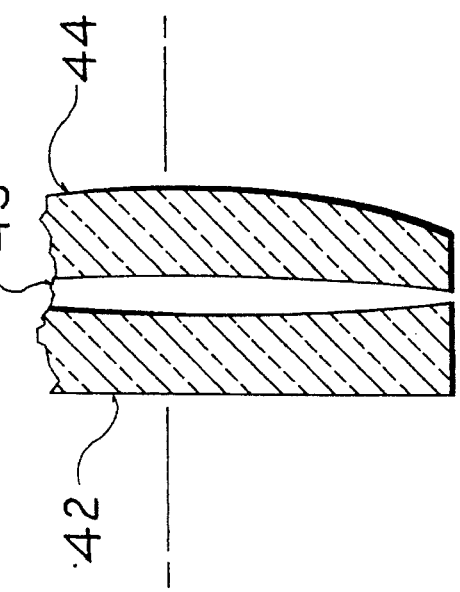

FIG_14
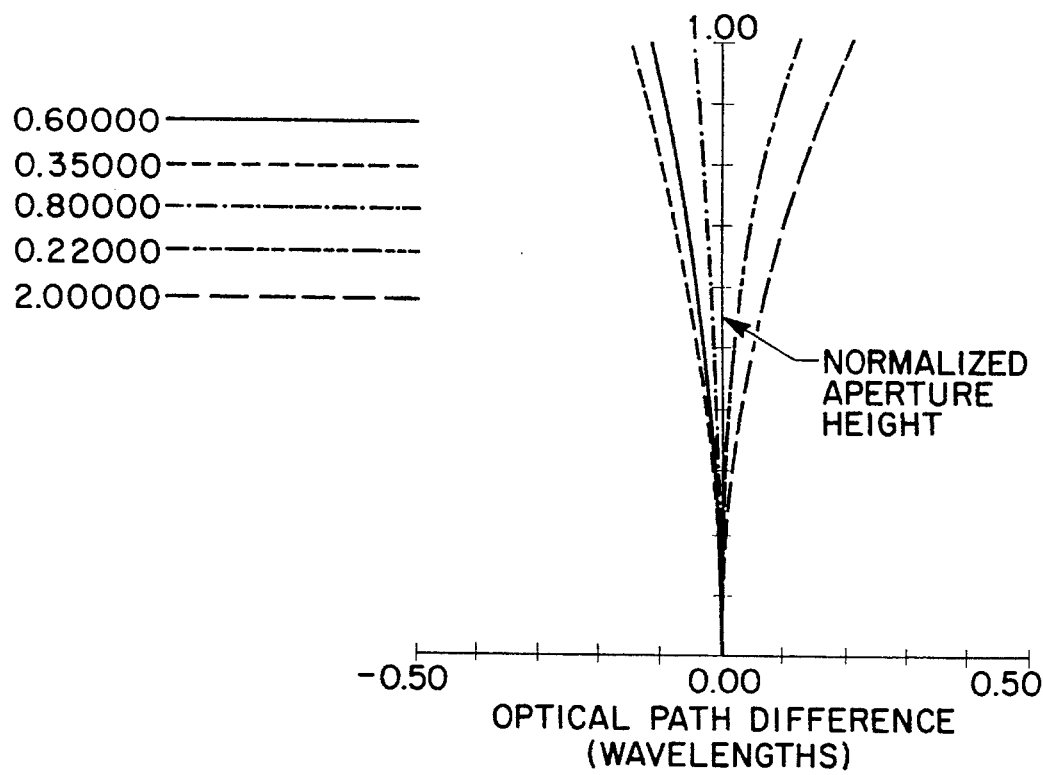
FIG_15
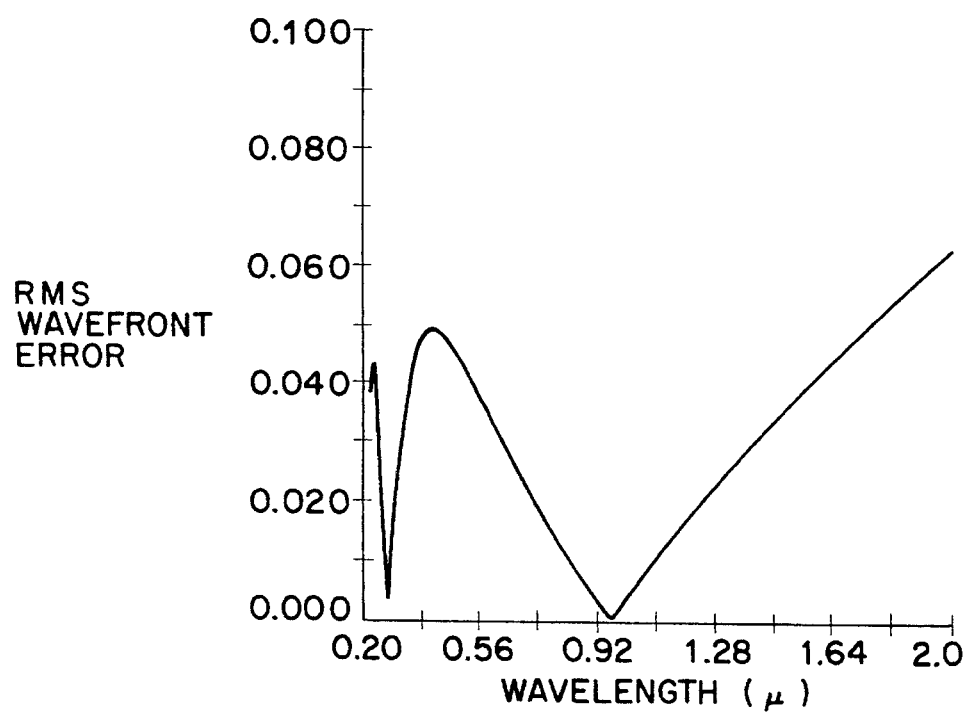

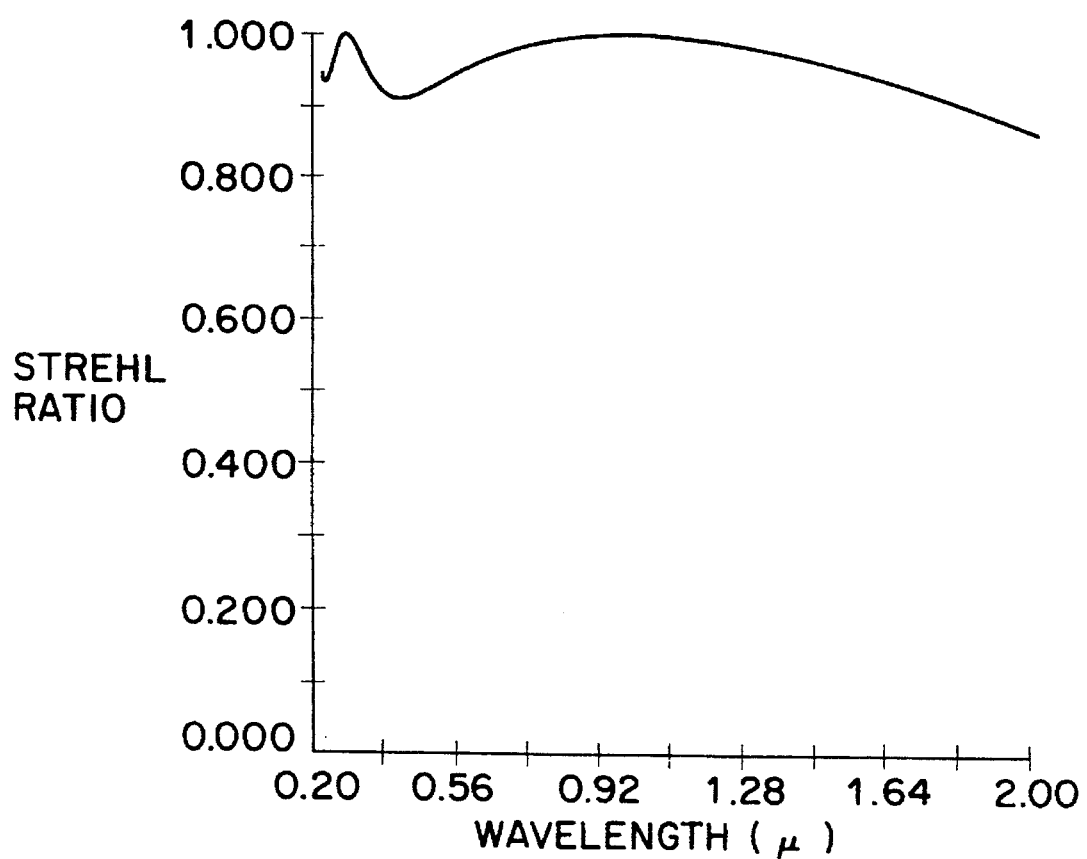
FIG_16

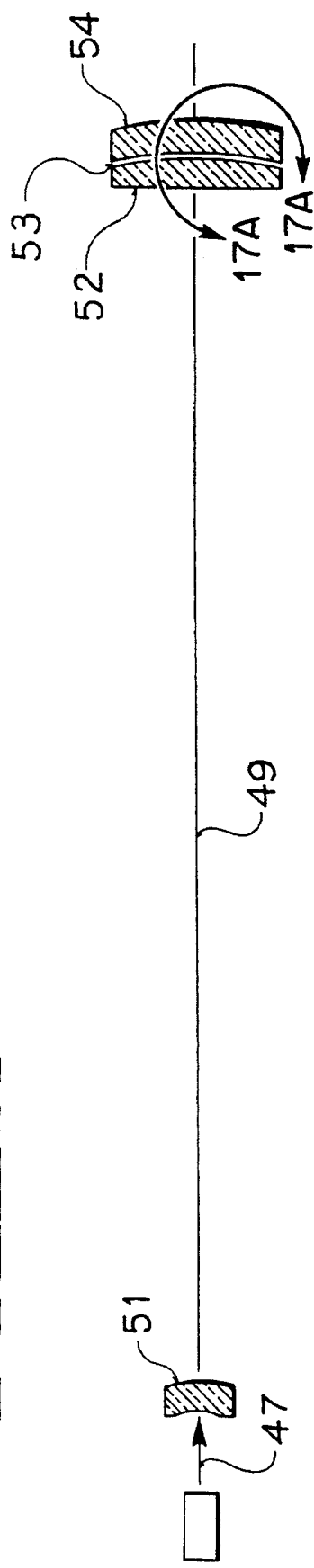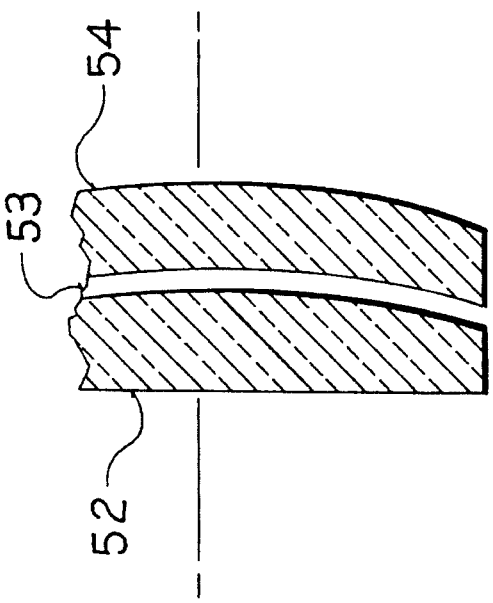

FIG_18
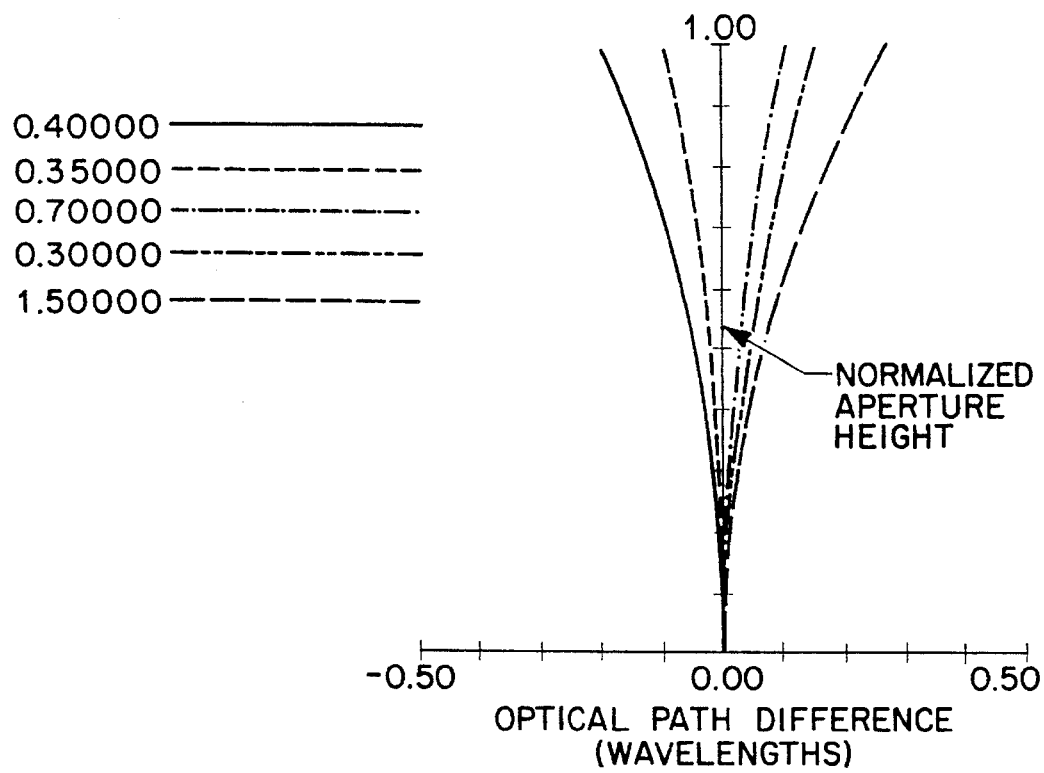
FIG_19
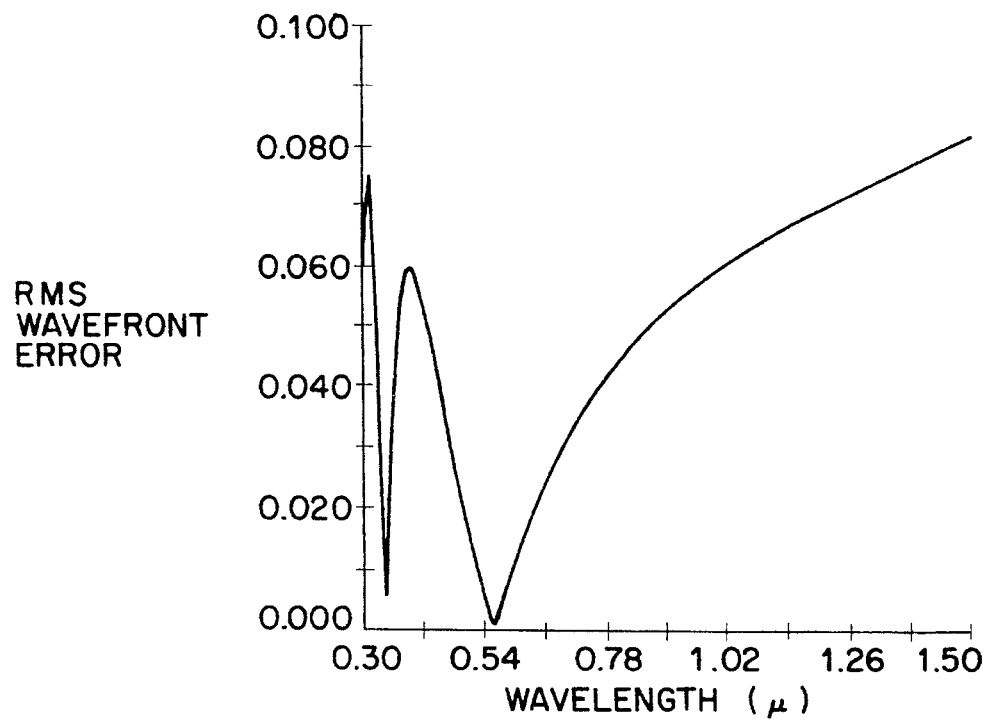

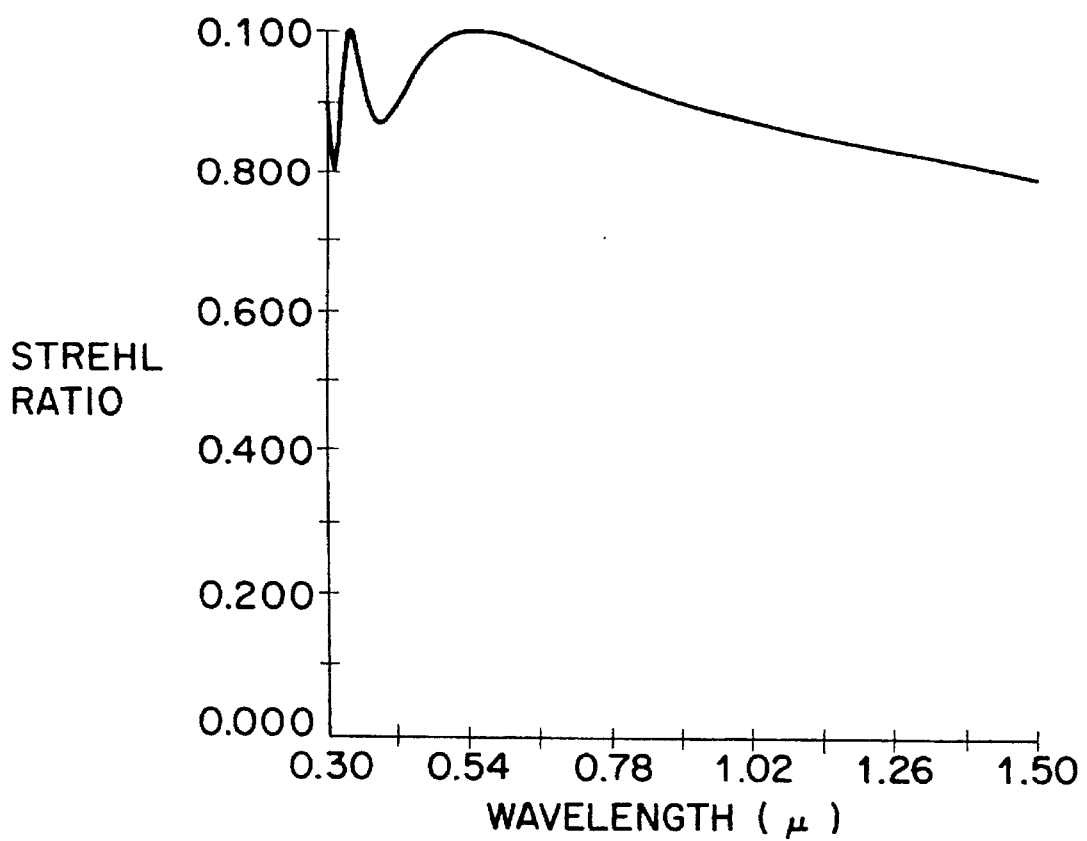
FIG_20

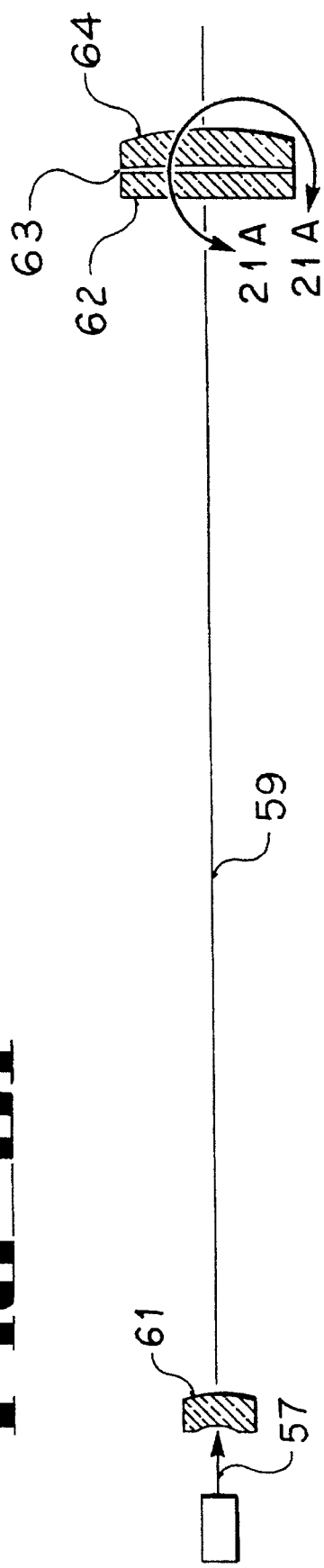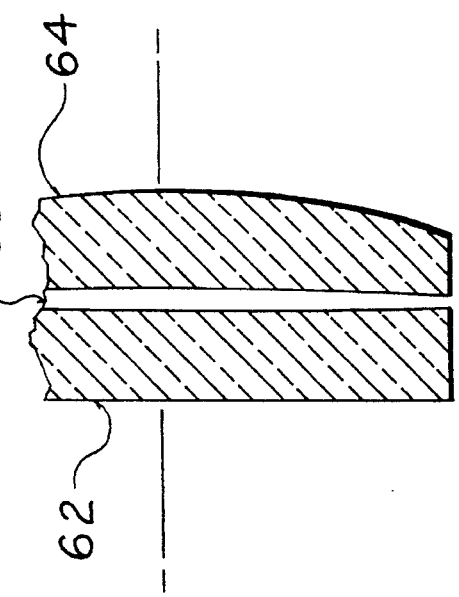

FIG_22
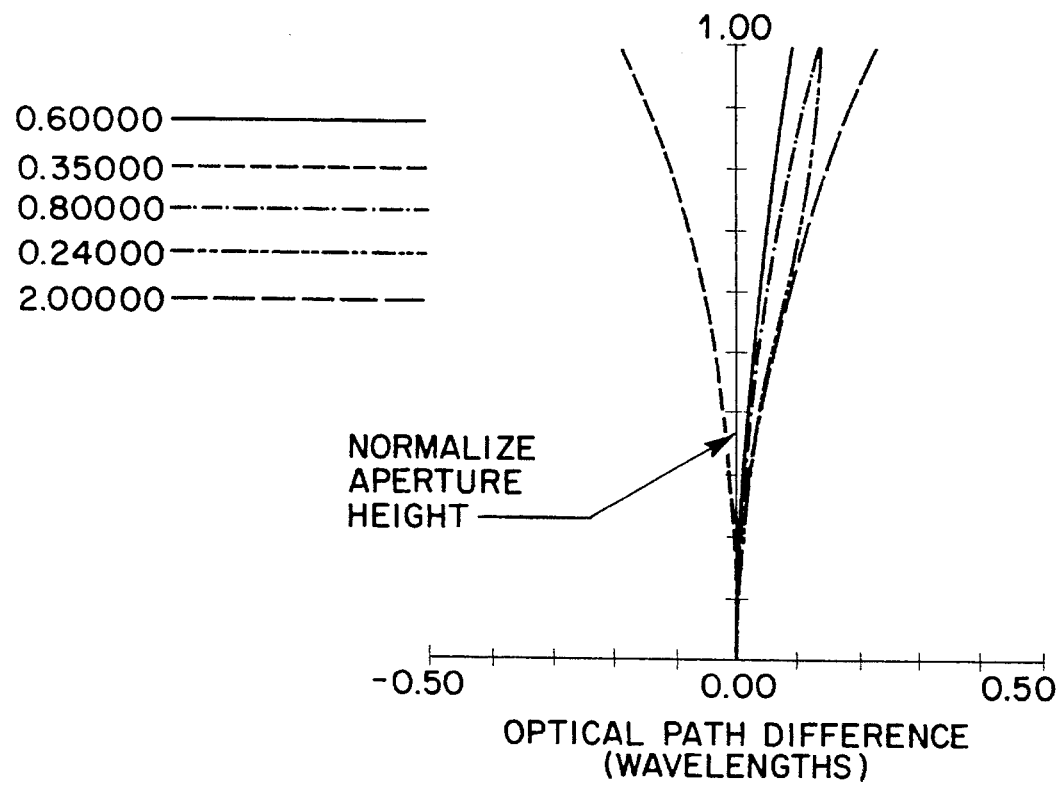
FIG_23
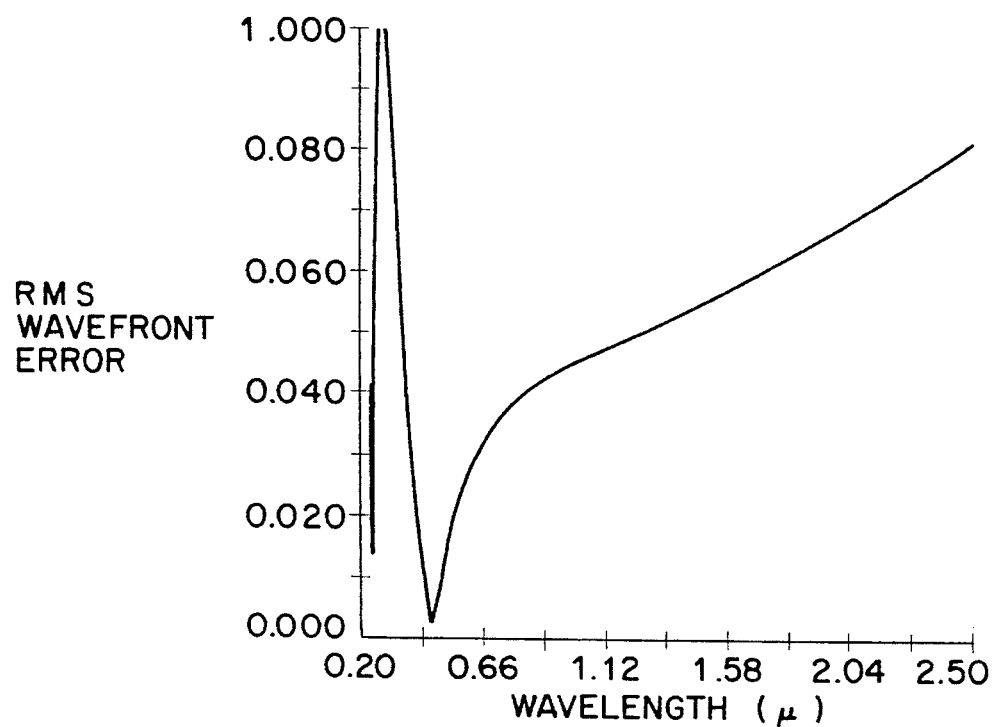

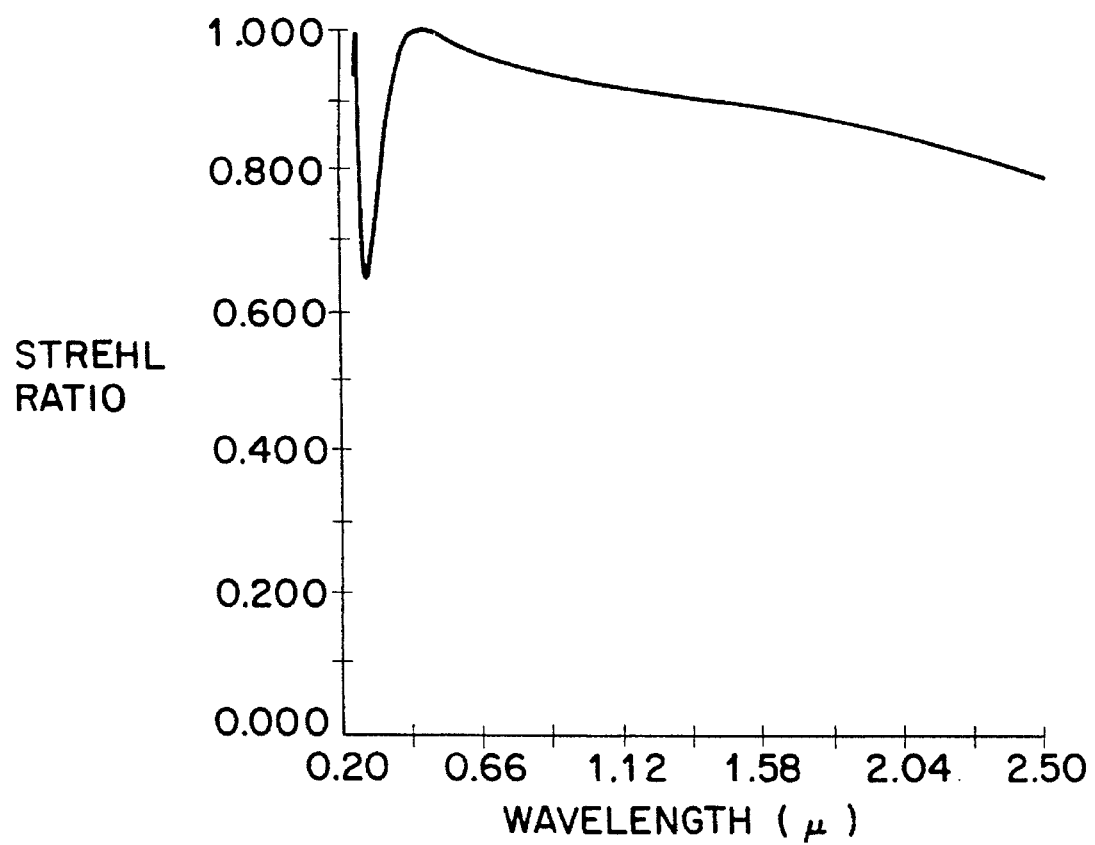
FIG_24

LASER BEAM EXPANDERS

CROSS-REFERENCE TO RELATED APPLICATION

The present application is related to copending U.S. patent application Ser. No. 08/011,551, filed Feb. 1, 1993. The present application is further related to U.S. patent application Ser. No. 08/014,596, filed Feb. 8, 1993, hereby incorporated by reference.

TECHNICAL FIELD

This invention relates generally to laser beam expanders, and more particularly to high-performance laser beam expanders whose lens elements are made of crystalline and liquid optical materials.

BACKGROUND OF THE INVENTION

Previously, beam expanders such as laser beam expanders have been designed to operate at a specific wavelength and necessitated additional beam expanders for other wavelengths. This duplication is expensive, creating a need for a single system capable of operating over a broad spectral region.

Until the present invention, design forms had not been available for high-performance laser beam expanders capable of operating from the ultraviolet through the visible and into the near infared spectral regions.

SUMMARY OF THE INVENTION

In accordance with the illustrated embodiments of the present invention, laser beam expanders (10) include lithium fluoride or barium fluoride or potassium bromide for the crystalline lens elements (11, 12, 14; 21, 22, 24; 31, 32, 34; 41, 42, 44; 51, 52, 54; 61, 62, 64), and include specified optical-quality liquids commercially available from R. L. Cargille Laboratories of Cedar Grove, N.J. are used for the liquid lens elements (13; 23; 33; 43; 53; 63).

By using laser beam expanders whose lens elements include crystalline and liquid lens elements, design options are made available which provide diffraction-limited performance without refocussing over various wavelength ranges including the wavelength range from 0.24 to 2.5 microns.

BRIEF DESCRIPTION OF THE DRAWINGS

FIG. 1 is a pictorial illustration of a 5 X laser beam expander for a laser beam according to the present invention whose lens elements are made of lithium fluoride and Cargille 400513 liquid.

FIG. 1A is an enlarged view of a portion of the 5 X laser beam expander enclosed within line 1A—1A of FIG. 1.

FIG. 2 is a plot of normalized aperture height vs. optical path difference at five different wavelengths for the 5 X laser beam expander of FIG. 1.

FIG. 3 is a plot of root-mean-square (RMS) wavefront error vs. wavelength over the wavelength range from 0.3 micron to 1.5 micron for the 5 X laser beam expander of FIG. 1.

FIG. 4 is a plot of Strehl ratio versus wavelength over the wavelength range from 0.3 micron to 1.5 micron for the 5 X laser beam expander of FIG. 1.

FIG. 5 is a pictorial illustration of a 5 X laser beam expander for a laser beam according to the present invention whose lens elements are made of barium fluoride and Cargille 400513 liquid.

FIG. 5A is an enlarged view of a portion of the 5 X laser beam expander enclosed within line 5A—5A of FIG. 5.

FIG. 6 is a plot of normalized aperture height vs. optical path difference at five different wavelengths for the 5 X laser beam expander of FIG. 5.

FIG. 7 is a plot of RMS wavefront error vs. wavelength over the wavelength range from 0.3 micron to 2.5 micron for the 5 X laser beam expander of FIG. 5.

FIG. 8 is a plot of Strehl ratio versus wavelength over the wavelength range from 0.3 micron to 2.5 micron for the 5 X laser beam expander of FIG. 5.

FIG. 9 is a pictorial illustration of a 5 X laser beam expander according to the present invention whose lens elements are made of barium fluoride and Cargille 295990 liquid.

FIG. 9A is an enlarged view of a portion of the 5 X laser beam expander enclosed within line 9A—9A of FIG. 9.

FIG. 10 is a plot of normalized aperture height vs. optical path difference at five different wavelengths for the 5 X laser beam expander of FIG. 9.

FIG. 11 is a plot of RMS wavefront error vs. wavelength over the wavelength range from 0.24 micron to 1.5 micron for the 5 X laser beam expander of FIG. 9.

FIG. 12 is a plot of Strehl ratio versus wavelength over the wavelength range from 0.24 micron to 1.5 micron for the 5 X laser beam expander of FIG. 9.

FIG. 13 is a pictorial illustration of a 4 X laser beam expander for a laser beam according to the present invention whose lens elements are made of barium fluoride and Cargille 295990 liquid.

FIG. 13A is an enlarged view of a portion of the 4 X laser beam expander enclosed within line 13A—13A of FIG. 13.

FIG. 14 is a plot of normalized aperture height vs. optical path difference at five different wavelengths for the 4 X laser beam expander of FIG. 13.

FIG. 15 is a plot of RMS wavefront error vs. wavelength over the wavelength range from 0.24 micron to 2.0 micron for the 4 X laser beam expander of FIG. 13.

FIG. 16 is a plot of Strehl ratio versus wavelength over the wavelength range from 0.24 micron to 2.0 micron for the 4 X laser beam expander of FIG. 13.

FIG. 17 is a pictorial illustration of a 5 X laser beam expander for a laser beam according to the present invention whose elements are made of potassium bromide and Cargille 400513 liquid.

FIG. 17A is an enlarged view of a portion of the 5 X laser beam expander enclosed within line 17A—17A of FIG. 17.

FIG. 18 is a plot of normalized aperture height vs. optical path difference at five different wavelengths for the 5 X laser beam expander of FIG. 17.

FIG. 19 is a plot of RMS wavefront error vs. wavelength over the wavelength range from 0.3 micron to 1.5 micron for the 5 X laser beam expander of FIG. 17.

FIG. 20 is a plot of Strehl ratio versus wavelength over the wavelength range from 0.3 micron to 1.5 micron for the 5 X laser beam expander of FIG. 17.

FIG. 21 is a pictorial illustration of a 5 X laser beam expander for a laser beam according to the present invention whose lens elements are made of potassium bromide and Cargille 295990 liquid.

FIG. 21A is an enlarged view of a portion of the 5 X laser beam expander enclosed within line 21A—21A of FIG. 21.

FIG. 22 is a plot of normalized aperture height vs. optical path difference at five different wavelengths for the 5 X laser beam expander of FIG. 21.

FIG. 23 is a plot of RMS wavefront error vs. wavelength over the wavelength range from 0.24 micron to 2.5 micron for the 5 X laser beam expander of FIG. 21.

FIG. 24 is a plot is a plot of Strehl ratio versus wavelength over the wavelength range from 0.24 micron to 2.5 micron for the 5 X laser beam expander of FIG. 21.

DETAILED DESCRIPTION OF THE PREFERRED EMBODIMENTS

In FIG. 1, a 5 X laser beam expander 10 according to the present invention is illustrated in which four lens elements 11, 12, 13, and 14 are coaxially disposed along an optic axis 9. The laser beam expander is an a focal lens system designed to expand a laser beam 7. The first lens element 11 is made of optical-quality lithium fluoride, a crystalline material, which is commercially obtainable from suppliers such as Harshaw Chemical Co. of Solon, Ohio. The second lens element 12 is likewise made of lithium fluoride. The third lens element 13 includes an optical liquid that is commercially available from R. L. Cargille Laboratories of Cedar Grove, N.J. The fourth lens element 14 is made of lithium fluoride.

The lens elements 11, 12, 13, and 14 can be mounted in a conventional manner. An effective technique for containing the liquid lens element 13 between the rigid lens elements 12 and 14 made of lithium fluoride is described in copending U.S. patent application Ser. No. 08/014,596 filed on Feb. 8, 1993.

In FIG. 1A, portions of the lens elements 12, 13, and 14 are shown in expanded view to illustrate the liquid lens element 13 contained between the crystalline (i.e., barium fluoride) lens elements 12 and 14.

The Cargille liquid which forms the lens element 13 is a siloxane of proprietary composition, which is marketed under the designation as a laser liquid. This particular Cargille liquid can be uniquely identified according to the U.S. Mil-Spec system by code number 400513, which identifies a liquid whose nominal index of refraction at the wavelength of the sodium d spectral line (i.e., 0.58756 micron) at a temperature of 25° C. has the value 1.400 to the third decimal place, and whose Abbe number has the value 51.3 to the first decimal place. The optical properties of lithium fluoride (LiF) are well known. See, H. H. Li, Journal of Physics and Chemistry Reference Data, Volume 5, page 329 (1976).

The laser beam expander illustrated in FIG. 1 expands an input laser beam from a diameter of 2 mm to a diameter of 10 mm (i.e., to produce a 5 X expansion) without requiring refocussing anywhere in the spectral range from 0.3 micron to 1.5 microns. The laser beam expander of FIG. 1 provides diffraction-limited performance over that spectral range, and chromatic aberration is virtually absent in the expanded beam.

The 5 X laser beam expander of FIG. 1 has an optical prescription, which is specified in tabular format as follows:

TABLE I

| Surface No. | Radius (mm) | Thickness (mm) | $N_d$ | $V_d$ | Material |
| --- | --- | --- | --- | --- | --- |
| 1 | −28.185276 | 3.0000 | 1.392147 | 97.29 | LiF |
| 2 | −125.314251 | 359.27367 | | | |
| 3 | −429.834471 | 3.0000 | 1.392147 | 97.29 | LiF |
| 4 | −141.450738 | 0.5000 | 1.401102 | 51.43 | 400513 |
| 5 | −310.063238 | 3.0000 | 1.392147 | 97.29 | LiF |
| 6 | −126.569437 | | | | | where the surfaces of the lens elements are numbered consecutively from left to right along an optic axis 9 in accordance with optical design convention. Thus, surfaces No. 1 and No. 2 are the left and right surfaces, respectively, of the lithium fluoride (LiF) lens element 11. Under the thickness column next to Surface No. 2, a distance between Surface No. 2 and No. 3 in millimeters is listed showing the separation between the singlet lens and the lens set including Surface No. 3. In the present embodiment, air fills the space. However, it should be noted that the laser beam expander may function as well with vacuum or other relatively transparent environments contained within the spacing between Surface Nos. 2 or 3, with perhaps minor adjustments in spacing and lens shaping. Surface No. 3 is the left surface of the lithium fluoride lens element 12. Surface No. 4 is both the right surface of the lithium fluoride lens element 12, and the left surface of the liquid lens element 13. Surface No. 5 is both the fight surface of the liquid lens element 13, and the left surface of the lithium fluoride lens element 14. Surface No. 6 is the right surface of the lithium fluoride lens element 14. From the foregoing description, it should be clear that liquid is in contact with and takes the shape of, the adjacent lens surfaces. It should further be noted in this and following embodiments that the crystalline and liquid lens materials are selected to be inert with respect to each other.

The radius listed for each lens surface in Table I is the radius of curvature expressed in millimeters. In accordance with optical design convention, the radius of curvature of a lens surface is positive if the center of curvature of the surface lies to the right of the surface, and negative if the center of curvature of the surface lies to the left of the surface. The thickness listed for each lens surface is the thickness expressed in millimeters of the lens element bounded on the left by the surface. The thickness of each lens element of the laser beam expander shown in FIG. 1 is measured along the optic axis 9.

The column headed $N_d$ in Table I refers to the index of refraction of the lens element bounded on the left by the indicated surface at the wavelength of the sodium d spectral line (i.e., 0.58756 micron). The column headed $V_d$ refers to the Abbe number for the lens element bounded on the left by the indicated surface. The material listed for each surface in Table I refers to the type of material bounded on the left by the indicated surface.

The index of refraction of an optical material varies with wavelength. The indices of refraction for the two different materials comprising the lens elements of the laser beam expander of FIG. 1 at five representative wavelengths in the range from 0.3 micron to 1.5 micron (i.e., $N_1$ at 0.40000 micron; $N_2$ at 0.35000 micron; $N_3$ at 0.70000 micron; $N_4$ at 0.30000 micron; and $N_5$ at 1.50000 micron) are tabulated as follows:

TABLE II

| Material | $N_1$ | $N_2$ | $N_3$ | $N_4$ | $N_5$ |
|---|---|---|---|---|---|
| LiF | 1.398939 | 1.402750 | 1.390218 | 1.408705 | 1.383156 |
| 400513 | 1.415243 | 1.423848 | 1.397626 | 1.439067 | 1.389945 |

It is instructive to evaluate the performance of the 5 X laser beam expander shown in FIG. 1 at each of the above-specified wavelengths. A graphical indication of performance of a lens system at a particular wavelength is provided by a plot of normalized aperture height as a function of optical path difference for that wavelength. In FIG. 2, plots of normalized aperture height as a function of optical path difference are shown for the five wavelengths for which the indices of refraction are specified in Table II. It may be seen from FIG. 2 that the maximum wavefront error for any one of the five plotted wavelengths is less than $\lambda/4.3$ for the 5 X laser beam expander shown in FIG. 1.

The optical path difference (OPD) error of an optical system at a particular wavelength is defined as the difference between the optical path length of a ray traced through a particular location in the entrance pupil of the system at a specified field angle and the optical path length of a reference ray, where the reference ray is usually taken to be the "chief ray" or "principal ray" traced through the center of the pupil at the specified field angle. The wavefront error of an optical system at a particular field angle is calculated as the statistical root-mean-square (RMS) of the optical path differences of a number of rays traced through the system at a single wavelength. A grid of equally spaced rays is generally used, and statistics are accumulated with respect to the point in the image plane where the RMS wavefront error is a minimum for the particular field angle and wavelength.

FIG. 3 is a plot of root-mean-square (RMS) wavefront error versus wavelength for rays entering the 5 X laser beam expander of FIG. 1 parallel to the optic axis (i.e., at a field angle of zero) calculated over the wavelength range from 0.3 micron to 1.5 micron. It may be seen from FIG. 3 that the RMS wavefront error of the 5 X laser beam expander of FIG. 1 is less than $\lambda/14.7$ between the wavelengths of 0.3 micron and 1.5 micron. The average RMS wavefront error over this wavelength range for the laser beam expander of FIG. 1 is $\lambda/28.7$.

FIG. 4 is a plot of the Strehl ratio versus wavelength for rays entering the 5 X laser beam expander of FIG. 1 parallel to the optic axis 9 (i.e., at a field angle of zero) calculated over the wavelength range from 0.3 micron to 1.5 micron. The Strehl ratio is the ratio of the peak intensity in the diffraction point spread function of the optical system to that of a perfect (or abberation-free) diffraction-limited optical system. The average Strehl ratio is 0.94 over the wavelength range.

In FIG. 5, an alternative embodiment of a laser beam expander according to the present invention is illustrated in which the lens elements are made of barium fluoride and Cargille 400513 liquid. The laser beam expander of FIG. 5 expands an input laser beam 17 from a diameter of 2 mm to a diameter of 10 mm (i.e., to provide a 5 X expansion) with diffraction-limited performance without requiring refocussing anywhere in the spectral range from 0.3 micron to 2.5 micron. Optical-quality barium fluoride is obtainable from suppliers such as Harshaw Chemical Co. of Solon, Ohio. The properties of barium fluoride are well known. (See, H. H. Li, Journal of Physics and Chemistry Reference Data, Volume 9, page 161 (1980)).

The 5 X laser beam expander of FIG. 5 comprises four lens elements 21, 22, 23, and 24, which are coaxially disposed along an optic axis. The first lens element 21 is made of barium fluoride (BaF). The second lens element 22 is likewise made of barium fluoride. The third lens element 23 includes Cargille 400513 liquid, and the fourth lens element 24 is made of barium fluoride.

In FIG. 5A, portions of the lens elements 22, 23, and 24 are shown in expanded view to illustrate the liquid lens element 23 contained between the crystalline (i.e., barium fluoride) lens elements 22 and 24.

The 5 X laser beam expander of FIG. 5 has an optical prescription, which is specified in tabular format as follows:

TABLE III

| Surface No. | Radius (mm) | Thickness (mm) | $N_d$ | $V_d$ | Material |
|---|---|---|---|---|---|
| 1 | −26.769407 | 3.0000 | 1.474563 | 81.77 | BaF |
| 2 | −96.847130 | 300.0000 | | | |
| 3 | −345.096979 | 3.0000 | 1.474563 | 81.77 | BaF |
| 4 | −107.736357 | 0.5000 | 1.401102 | 51.43 | 400513 |
| 5 | −489.432125 | 3.0000 | 1.474563 | 81.77 | BaF |
| 6 | −139.750445 | | | | | where the surfaces of the lens elements are numbered consecutively from left to right along the optic axis 19 according to the same convention as described above in connection with Table I. The radii of curvature, axial thicknesses, and the values of $N_d$ and $V_d$ are specified in the same manner as in Table I.

The index of refraction of an optical material varies with wavelength. The indices of refraction for the two different materials comprising the lens elements of the laser beam expander of FIG. 5 at five representative wavelengths in the range from 0.3 micron to 2.500 micron (i.e., $N_1$ at 0.40000 micron; $N_2$ at 0.35000 micron; $N_3$ at 0.70000 micron; $N_4$ at 0.30000 micron; and $N_5$ at 2.50000 micron) are tabulated as follows:

TABLE IV

| Material | $N_1$ | $N_2$ | $N_3$ | $N_4$ | $N_5$ |
|---|---|---|---|---|---|
| BaF | 1.484906 | 1.491071 | 1.471964 | 1.501027 | 1.463067 |
| 400513 | 1.415243 | 1.423848 | 1.397626 | 1.439067 | 1.379176 |

In FIG. 6, performance of the 5 X laser beam expander of FIG. 5 is illustrated by plots of normalized aperture height as a function of optical path difference for the same five wavelengths for which the indices of refraction are specified in Table II. It may be seen from FIG. 6 that the maximum wavefront error of the 5 X laser beam expander of FIG. 5 for any one of the five plotted wavelengths is less than $\lambda/6.8$.

FIG. 7 is a plot of RMS wavefront error vs. wavelength for rays 17 entering the 5 X laser beam expander of FIG. 5 parallel to the optic axis 19 (i.e., at a field angle of zero) calculated over the wavelength range from 0.3 micron to 2.5 micron. It may be seen from FIG. 7 that the wavefront error of the 5 X laser beam expander of FIG. 5 is less than $\lambda/22.3$ between the wavelengths of 0.3 micron and 2.5 micron. The average RMS wavefront error over this wavelength range for the laser beam expander of FIG. 5 is $\lambda/38.9$.

FIG. 8 is a plot of the Strehl ratio versus wavelength for rays entering the 5 X laser beam expander of FIG. 5 parallel to the optic axis 19 (i.e., at a field angle of zero) calculated over the wavelength range from 0.3 micron to 2.5 micron. The Strehl ratio is the ratio of the peak intensity in the diffraction point spread function of the optical system to that of a perfect (or abberation-free) diffraction-limited optical system. The average Strehl ratio is 0.97 over the wavelength range.

In FIG. 9, an alternate of a 5 X laser beam expander according to the present invention is illustrated whose lens elements include barium fluoride and Cargille 295990 liquid. The Cargille liquid is a perfluorocarbon (also known as perfluorochemical) of propriety composition that is commercially available from R. L. Cargille Laboratories of Cedar Grove, N.J. This particular Cargille liquid can be uniquely identified according to the U.S. Mil-Spec system by code number 295990, which identifies a liquid whose nominal index of refraction at the wavelength of the sodium d spectral line (i.e., 0.58756 micron) at a temperature of 25° C. has the value 1.295 to the third decimal place, and whose Abbe number has the value 99.0 to the first decimal place. Optical-quality barium fluoride is obtainable from suppliers such as Harshaw Chemical Co. of Solon, Ohio. The properties of barium fluoride are well known. (See, H. H. Li, Journal of Physics and Chemistry Reference Data, Volume 9, page 161 (1980)).

The 5 X laser beam expander of FIG. 9 comprises four lens elements 31, 32, 33, and 34, which are coaxially disposed with respect to each other along an optic axis 29. The first lens element 31 is made of barium fluoride. The second lens element 32 is likewise made of barium fluoride. The third lens element 33 includes Cargille 295990 liquid; and the fourth lens element 34 is made of barium fluoride.

In FIG. 9A, portions of the lens elements 32, 33, and 34 are shown in expanded view to illustrate the liquid lens element 33 contained between the crystalline (i.e., barium fluoride) lens elements 32 and 34. The 5 X laser beam expander of FIG. 9 has an optical prescription, which is specified in Table V as follows:

TABLE V

| Surface No. | Radius (mm) | Thickness (mm) | $N_d$ | $V_d$ | Material |
|---|---|---|---|---|---|
| 1 | −26.108874 | 3.0000 | 1.474563 | 81.77 | BaF |
| 2 | −67.092838 | 350.057572 | | | |
| 3 | 597.17992 | 3.0000 | 1.474563 | 81.77 | BaF |
| 4 | 95.353178 | 1.5000 | 1.296386 | 100.98 | 295990 |
| 5 | −56.372595 | 3.0000 | 1.474563 | 81.77 | BaF |
| 6 | −74.373237 | | | | | where the surfaces of the lens elements are numbered consecutively from left to right along the optic axis 29 according to the same convention as used in Table I. Similarly, the radii of curvature, axial thicknesses, and the values of $N_d$ and $V_d$, are specified in the same manner as in Table I.

The index of refraction of an optical material varies with wavelength. The indices of refraction for the two different materials comprising the lens elements of the laser beam expander of FIG. 9 at five representative wavelengths in the range from 0.24 micron to 1.5 micron (i.e., $N_1$ at 0.40000 micron; $N_2$ at 0.30000 micron; $N_3$ at 0.70000 micron; $N_4$ at 0.22000 micron; and $N_5$ at 1.50000 micron) are tabulated as follows:

TABLE VI

| Material | $N_1$ | $N_2$ | $N_3$ | $N_4$ | $N_5$ |
|---|---|---|---|---|---|
| BaF | 1.484906 | 1.501027 | 1.471964 | 1.537843 | 1.466312 |
| 295990 | 1.301480 | 1.309204 | 1.295028 | 1.327036 | 1.291078 |

In FIG. 10, performance of the 5 X laser beam expander of FIG. 9 is illustrated by plots of normalized aperture height as a function of optical path difference for the five wavelengths for which the indices of refraction are specified in Table VI. It may be seen from FIG. 10 that the maximum wavefront error of the 5 X laser beam expander shown in FIG. 9 for any one of the five plotted wavelengths is less than λ/3.9.

FIG. 11 is a plot of RMS wavefront error versus wavelength for rays 27 entering the 5 X laser beam expander of FIG. 9 parallel to the optic axis 29 (i.e., at a field angle of zero) calculated over the wavelength range from 0.24 micron to 1.5 micron. It may be seen from FIG. 11 that the wavefront error of the 5 X laser beam expander of FIG. 9 is less than λ/13.3 between the wavelengths of 0.24 micron and 1.5 micron. The average RMS wavefront error over this wavelength range for the laser beam expander of FIG. 9 is λ/30.2.

FIG. 12 is a plot of the Strehl ratio versus wavelength for rays entering the 5 X laser beam expander of FIG. 9 parallel to the optic axis (i.e., at a field angle of zero) calculated over the wavelength range from 0.24 micron to 1.5 micron. The Strehl ratio is the ratio of the peak intensity in the diffraction point spread function of the optical system to that of a perfect (or abberation-free) diffraction-limited optical system. The average Strehl ratio is 0.94 over the wavelength range.

In FIG. 13, an alternative embodiment of a laser beam expander according to the present invention is illustrated in which lens elements consist of barium fluoride and Cargille 295990 liquid. The laser beam expander of FIG. 13 provides a 4 X expansion with substantially diffraction-limited performance without requiring refocussing anywhere in the spectral range from 0.24 micron to 2.0 micron.

Optical-quality barium fluoride is obtainable from suppliers such as Harshaw Chemical Co. of Solon, Ohio. The properties of barium fluoride are well known. (See, H. H. Li, Journal of Physics and Chemistry Reference Data, Volume 9, page 161 (1980)). The Cargille liquid is a perfluorocarbon (also known as perfluorochemical) of propriety composition that is commercially available from R. L. Cargille Laboratories of Cedar Grove, N.J. This particular Cargille liquid can be uniquely identified according to the U.S. Mil-Spec system by code number 295990, which identifies a liquid whose nominal index of refraction at the wavelength of the sodium d spectral line (i.e., 0.58756 micron) at a temperature of 25° C. has the value 1.295 to the third decimal place, and whose Abbe number has the value 99.0 to the first decimal place.

The 4 X laser beam expander of FIG. 13 comprises four lens elements 41, 42, 43, and 44, which are coaxially disposed with respect to each other along an optic axis 39. The first lens element 41 is made of barium fluoride. The second lens element 42 is likewise made of barium fluoride. The third lens element 43 includes Cargille 295990 liquid, and the fourth lens element 44 is made of barium fluoride.

In FIG. 13A, portions of the lens elements 42, 43, and 44 are shown in expanded view to illustrate the liquid lens element 43 contained between the crystalline (i.e., barium fluoride) lens elements 42 and 44.

The 4 X laser beam expander of FIG. 13 has an optical prescription, which is specified in tabular format as follows:

TABLE VII

| Surface No. | Radius (mm) | Thickness (mm) | $N_d$ | $V_d$ | Material |
|---|---|---|---|---|---|
| 1 | −31.088991 | 3.0000 | 1.474563 | 81.77 | BaF |
| 2 | −70.233397 | 350.008619 | | | |
| 3 | 428.533305 | 3.0000 | 1.47563 | 31.77 | BaF |
| 4 | 101.498781 | 1.5000 | 1.296386 | 100.98 | 295990 |

TABLE VII-continued

| Surface No. | Radius (mm) | Thickness (mm) | $N_d$ | $V_d$ | Material |
|---|---|---|---|---|---|
| 5 | −59.943058 | 3.0000 | 1.47563 | 81.77 | BaF |
| 6 | −83.814257 | | | | | where the surfaces of the lens elements are numbered consecutively from left to right along the optic axis 39 according to the same convention as described above in connection with Table I. The radii of curvature, axial thicknesses, and the values of $N_d$ and $V_d$ are specified in the same manner as in Table I.

The index of refraction of an optical material varies with wavelength. The indices of refraction for the two different materials comprising the lens elements of the laser beam expander of FIG. 13 at five representative wavelengths in the range from 0.24 micron to 2.0 micron (i.e., $N_1$ at 0.60000 micron; $N_2$ at 0.35000 micron; $N_3$ at 0.80000 micron; $N_4$ at 0.22000 micron; and $N_5$ at 2.00000 micron) are tabulated as follows:

TABLE VIII

| Material | $N_1$ | $N_2$ | $N_3$ | $N_4$ | $N_5$ |
|---|---|---|---|---|---|
| BaF | 1.474203 | 1.491071 | 1.470487 | 1.537843 | 1.464696 |
| 400513 | 1.296201 | 1.304444 | 1.294208 | 1.327036 | 1.289033 |

In FIG. 14, performance of the 4 X laser beam expander of FIG. 13 is illustrated by plots of normalized aperture height as a function of optical path difference for the same five wavelengths for which the indices of refraction are specified in Table II. It may be seen from FIG. 14 that the maximum wavefront error of the 4 X laser beam expander of FIG. 13 for any one of the five plotted wavelengths is less than $\lambda/4.7$.

FIG. 15 is a plot of RMS wavefront error rs. wavelength for rays 37 entering the 4 X laser beam expander of FIG. 13 parallel to the optic axis 39 (i.e., at a field angle of zero) calculated over the wavelength range from 0.24 micron to 2.0 micron. It may be seen from FIG. 15 that the wavefront error of the 4 X laser beam expander of FIG. 13 is less than $\lambda/16.1$ between the wavelengths of 0.24 micron and 2.0 micron. The average RMS wavefront error over this wavelength range for the laser beam expander of FIG. 13 is $\lambda/33.2$.

FIG. 16 is a plot of the Strehl ratio versus wavelength for rays 37 entering the 4 X laser beam expander of FIG. 13 parallel to the optic axis 39 (i. e., at a field angle of zero) calculated over the wavelength range from 0.24 micron to 2.0 micron. The Strehl ratio is the ratio of the peak intensity in the diffraction point spread function of the optical system to that of a perfect (or abberation-free) diffraction-limited optical system. The average Strehl ratio achieved for the lens is 0.95 over the wavelength range.

In FIG. 17, an alternate embodiment of a 5 X laser beam expander according to the present invention is illustrated whose lens elements include potassium bromide and Cargille 400513 liquid. Optical-quality potassium bromide is obtainable from suppliers such as Harshaw Chemical Co. of Solon, Ohio. The properties of potassium bromide are well known. (See, H. H. Li, Journal of Physics and Chemistry Reference Data, Volume 5, page 329 (1976)). The Cargille liquid of which the lens element 13 is made is a siloxane of proprietary composition which is commercially available from R. L. Cargille Laboratories of Cedar Grove, N.J. This particular Cargille liquid can be uniquely identified according to the U.S. Mil-Spec system by code number 400513, which identifies a liquid whose nominal index of refraction at the wavelength of the sodium d spectral line (i.e., 0.58756 micron) at a temperature of 25° C has the value 1.400 to the third decimal place, and whose Abbe number has the value 51.3 to the first decimal place.

The 5 X laser beam expander of FIG. 17 comprises four lens elements 51, 52, 53, and 54, which are coaxially disposed with respect to each other along an optic axis 49. The first lens element 51 is made of potassium bromide. The second lens element 52 is likewise made of potassium bromide. The third lens element 53 includes Cargille 400513 liquid, and the fourth lens element 54 is made of potassium bromide (KBr).

In FIG. 17A, portions of the lens elements 52, 53, and 54 are shown in expanded view to illustrate the liquid lens element 53 contained between the crystalline (i.e., barium fluoride) lens elements 52 and 54.

The 5 X laser beam expander of FIG. 17 has an optical prescription that is specified in Table IX as follows:

TABLE IX

| Surface No. | Radius (mm) | Thickness (mm) | $N_d$ | $V_d$ | Material |
|---|---|---|---|---|---|
| 1 | −26.533554 | 3.0000 | 1.559948 | 33.67 | KBr |
| 2 | −89.955718 | 250.0000 | | | |
| 3 | −5534.615392 | 3.0000 | 1.559948 | 33.67 | KBr |
| 4 | 343.863393 | 1.0000 | 1.401102 | 51.43 | 400513 |
| 5 | −76.841080 | 3.0000 | 1.559948 | 33.67 | KBr |
| 6 | −99.095829 | | | | | where the surfaces of the lens elements are numbered consecutively from left to right along the optic axis 49 according to the same convention as described above in connection with Table I. The radii of curvature, axial thicknesses, and the values of $N_d$ and $V_d$ are specified in the same manner as in Table I.

The index of refraction of an optical material varies with wavelength. The indices of refraction for the two different materials comprising the lens elements of the laser beam expander of FIG. 17 at five representative wavelengths in the range from 0.3 micron to 1.5 micron (i.e., $N_1$ at 0.40000 micron; $N_2$ at 0.35000 micron; $N_3$ at 0.70000 micron; $N_4$ at 0.30000 micron; and $N_5$ at 1.50000 micron) are tabulated as follows:

TABLE X

| Material | $N_1$ | $N_2$ | $N_3$ | $N_4$ | $N_5$ |
|---|---|---|---|---|---|
| KBr | 1.591173 | 1.611685 | 1.552782 | 1.648243 | 1.539988 |
| 400513 | 1.415243 | 1.423848 | 1.397626 | 1.439067 | 1.389945 |

In FIG. 18, performance of the 5 X laser beam expander of FIG. 17 is illustrated by plots of normalized aperture height as a function of optical path difference for the five wavelengths for which the indices of refraction are specified in Table X. It may be seen from FIG. 18 that the maximum wavefront error of the 5 X laser beam expander of FIG. 17 for any one of the five plotted wavelengths is less than $\lambda/3.6$.

FIG. 19 is a plot of RMS wavefront error versus wavelength for rays 47 entering the 5 X laser beam expander of FIG. 17 parallel to the optic axis 49 (i.e., at a field angle of zero) calculated over the wavelength range from 0.3 micron to 1.5 micron. It may be seen from FIG. 19 that the wavefront error of the 5 X laser beam expander of FIG. 17 is less than $\lambda/12.5$ between the wavelengths of 0.3 micron and 1.5 micron. The average RMS wavefront error over this wavelength range for the laser beam expander of FIG. 17 is $\lambda/19.9$.

FIG. 20 is a plot of the Strehl ratio versus wavelength for rays 47 entering the 5 X laser beam expander of FIG. 17 parallel to the optic axis 49 (i.e., at a field angle of zero) calculated over the wavelength range from 0.3 micron to 1.5 micron. The Strehl ratio is the ratio of the peak intensity in the diffraction point spread function of the optical system to that of a perfect (or abberation-free) diffraction-limited optical system. An average Strehl ratio of 0.89 is obtained for the lens system.

In FIG. 21, an alternative embodiment of a laser beam expander according to the present invention is illustrated in which lens elements include potassium bromide and Cargille 295990 liquid. The laser beam expander of FIG. 21 expands an input laser beam from a diameter of 2 mm to a diameter of 10 mm (i.e., provides a 5 X expansion) with substantially diffraction-limited performance without requiring refocussing anywhere in the spectral range from 0.24 micron to 2.5 micron.

The 5 X laser beam expander of FIG. 21 comprises four lens elements 61, 62, 63, and 64, which are coaxially disposed with respect to each other along an optic axis 59. The first lens element 61 is made of potassium bromide. The second lens element 62 is likewise made of potassium bromide. The third lens element 63 includes Cargille 295990 liquid, and the fourth lens element 64 is made of potassium bromide.

In FIG. 21A, portions of the lens elements 62, 63, and 64 are shown in expanded view to illustrate the liquid lens element 63 contained between the crystalline (i.e., potassium bromide) lens elements 62 and 64.

The 5 X laser beam expander of FIG. 21 has an optical prescription, which is specified in Table XI as follows:

TABLE XI

| Surface No. | Radius (mm) | Thickness (mm) | $N_d$ | $V_d$ | Material |
| --- | --- | --- | --- | --- | --- |
| 1 | −39.688685 | 3.0000 | 1.559948 | 33.67 | KBr |
| 2 | −193.458300 | 350.0000 | | | |
| 3 | −561.473238 | 3.0000 | 1.559948 | 33.67 | KBr |
| 4 | 598.944093 | 1.5000 | 1.296386 | 100.98 | 295990 |
| 5 | −147.782900 | 3.0000 | 1.559948 | 33.67 | KBr |
| 6 | −103.989822 | | | | | where the surfaces of the lens elements are numbered consecutively from left to right along the optic axis according to the same convention as described above in connection with Table I. The radii of curvature, axial thicknesses, and the values of $N_d$ and $V_d$ are specified in the same manner as in Table I.

The index of refraction of an optical material varies with wavelength. The indices of refraction for the two different materials comprising the lens elements of the laser beam expander of FIG. 21 at five representative wavelengths in the range from 0.24 micron to 2.500 micron (i.e., $N_1$ at 0.60000 micron; $N_2$ at 0.35000 micron; $N_3$ at 0.80000 micron; $N_4$ at 0.24000 micron; and $N_5$ at 2.00000 micron) are tabulated as follows:

TABLE XII

| Material | $N_1$ | $N_2$ | $N_3$ | $N_4$ | $N_5$ |
| --- | --- | --- | --- | --- | --- |
| KBr | 1.558935 | 1.611685 | 1.548894 | 1.757484 | 1.538328 |
| 400513 | 1.296201 | 1.304444 | 1.294208 | 1.320380 | 1.289033 |

In FIG. 22, performance of the 5 X laser beam expander of FIG. 21 is illustrated by plots of normalized aperture height as a function of optical path difference for the same five wavelengths for which the indices of refraction are specified in Tables II, V and VIII. It may be seen from FIG. 22 that the maximum wavefront error of the 5 X laser beam expander of FIG. 21 for any one of the five plotted wavelengths is less than $\lambda/4.4$.

FIG. 23 is a plot of RMS wavefront error versus wavelength for rays 57 entering the 5 X laser beam expander of FIG. 21 parallel to the optic axis 59 (i.e., at a field angle of zero) calculated over the wavelength range from 0.24 micron to 2.5 micron. It may be seen from FIG. 23 that the wavefront error of the 5 X laser beam expander of FIG. 21 is less than $\lambda/9.6$ between the wavelengths of 0.24 micron and 2.5 micron. The average RMS wavefront error over this wavelength range for the laser beam expander of FIG. 21 is $\lambda/18.8$.

FIG. 24 is a plot of the Strehl ratio versus wavelength for rays 57 entering the 5 X laser beam expander of FIG. 21 parallel to the optic axis 59 (i.e., at a field angle of zero) calculated over the wavelength range from 0.24 micron to 2.5 micron. The Strehl ratio is a ratio of peak amplitude in the focus of the optical system to the diffraction-limited amplitude. An average Strehl ratio of 0.88 is obtained for the lens set.

Therefore, the present invention provides a laser beam expander which may be readily configured for various laser beam expander applications by changing parametric values of the exemplary design forms. For example, the singlet lens element in each embodiment may be replaced by a doublet lens whereby two lens elements may be used to provide greater negative power than that provided by the singlet lens element and in turn, permitting the design of an expander with a shortened length over the described embodiments, since the distance between the lens set and the doublet may be shortened.

I claim:

1. A beam expander having substantially diffraction-limited performance over a pre-selected wavelength range within the ultraviolet, visible and near infrared regions of the electromagnetic spectrum, said beam expander system comprising:

a lens set including first, second, and third lens elements disposed along an optical axis;

a fourth lens element spaced a pre-determined distance apart from said lens set along said optical axis;

said first, third, and fourth lens elements each comprising an optical crystal material;

said second lens element comprising a liquid having selected optical properties and being disposed between and in contact with the surfaces of said first and third lens elements; said crystalline material and said liquid being inert with respect to each other.

2. A beam expander as in claim 1, for a selected wavelength range extending between 0.24 micron and 2.5 microns and comprising:

each of the lens elements having selected surface curvatures for cooperatively expanding a beam within the selected wavelength range; said expander not requiring refocussing over said wavelength range.

3. A beam expander as in claim 1, each of the lens elements having selected surface curvatures for cooperatively expanding and color correcting a beam within the selected wavelength range.

4. A beam expander as in claim 1, said crystal material substantially consisting of lithium fluoride;

said liquid material substantially consisting of a siloxane.

5. A beam expander as in claim 4 for a selected wavelength range extending from 0.3 to 1.5 microns, and comprising:

each of the lens elements having selected surface curvatures for cooperatively expanding a beam within the selected wavelength range;

said expander not requiring refocussing over said wavelength range.

6. A beam expander as in claim 4, said pre-determined distance less than 375 millimeters;

said expander obtaining an expansion ratio of approximately 5×.

7. A beam expander as in claim 4, at least one lens element including a concave surface curvature; the expander for obtaining a maximum root-mean-square wavefront error of lambda/14.7 over said wavelength range, where lambda is a selected wavelength of radiation within said pre-determined wavelength range and passing through said expander.

8. A beam expander as in claim 4, at least one lens element including a concave surface curvature; the expander for obtaining an average root-mean-square wavefront error less than or equal to lambda/28.7 over said wavelength range, where lambda is a selected wavelength of radiation within said pre-determined wavelength range and passing through said expander.

9. A beam expander as in claim 4, at least one lens element including a concave surface curvature; the expander for obtaining a maximum wavefront error less than or equal to lambda/4.3 over said wavelength range, where lambda is a selected wavelength of radiation within said pre-determined wavelength range and passing through said expander.

10. A beam expander as in claim 4, at least one lens element including a concave surface curvature; the expander for obtaining an average Strehl ratio of at least 0.94 over said pre-determined wavelength range.

11. A beam expander as in claim 1, said crystal material substantially consisting of barium fluoride;

said liquid material substantially consisting of a siloxane.

12. A beam expander as in claim 11 for a selected wavelength range extending from 0.3 to 2.5 microns;

each of the lens elements having selected surface curvatures for cooperatively expanding a beam within the selected wavelength range;

said expander not requiring refocussing over said wavelength range.

13. A beam expander as in claim 11, said pre-determined distance less than 325 millimeters;

said expander for obtaining an expansion ratio of approximately 5×.

14. A beam expander as in claim 11, at least one lens element including a concave surface curvature; the expander for obtaining a maximum root-mean-square wavefront error of lambda/22.3 over said wavelength range, where lambda is a selected wavelength of radiation within said pre-determined wavelength range and passing through said expander.

15. A beam expander as in claim 11, at least one lens element including a concave surface curvature; the expander for obtaining an average root-mean-square wavefront error less than or equal to lambda/38.9 over said wavelength range, where lambda is a selected wavelength of radiation within said pre-determined wavelength range and passing through said expander.

16. A beam expander as in claim 11, at least one lens element including a concave surface curvature; the expander for obtaining a maximum wavefront error less than or equal to lambda/6.8 over said wavelength range, where lambda is a selected wavelength of radiation within said pre-determined wavelength range and passing through said expander.

17. A beam expander as in claim 11, at least one lens element including a concave surface curvature; the expander for obtaining an average Strehl ratio of at least 0.97 over said pre-determined wavelength range.

18. A beam expander as in claim 1, said crystal material substantially consisting of barium fluoride;

said liquid material substantially consisting of a perfluorocarbon.

19. A beam expander as in claim 18 for a selected wavelength range extending from 0.24 to 1.5 microns;

each of the lens elements having selected surface curvatures for cooperatively expanding a beam within the selected wavelength range;

said expander not requiring refocussing over said wavelength range.

20. A beam expander as in claim 18, said pre-determined distance less than 375 millimeters;

said expander obtaining an expansion ratio of approximately 5×.

21. A beam expander as in claim 18, at least one lens element including a concave surface curvature; the expander for obtaining a maximum root mean squared wavefront error of lambda/13.3 over said wavelength range, where lambda is a selected wavelength of radiation within said pre-determined wavelength range and passing through said expander.

22. A beam expander as in claim 18, at least one lens element including a concave surface curvature; the expander for obtaining an average root-mean-square wavefront error less than or equal to lambda/30.2 over said wavelength range, where lambda is a selected wavelength of radiation within said pre-determined wavelength range and passing through said expander.

23. A beam expander as in claim 18, at least one lens element including a concave surface curvature; the expander for obtaining a ray fan maximum wavefront error less than or equal to lambda/3.9 over said wavelength range where lambda is a selected wavelength of radiation within said pre-determined wavelength range and passing through said expander.

24. A beam expander as in claim 18, at least one lens element including a concave surface curvature; the expander for obtaining an average Strehl ratio of at least 0.94 over said pre-determined wavelength range.

25. A beam expander as in claim 18 for a selected wavelength range extending from 0.24 to 2.0 microns;

each of the lens elements having selected surface curvatures for cooperatively expanding a beam within the selected wavelength range;

said expander not requiring refocussing over said wavelength range.

26. A beam expander as in claim 18, said pre-determined distance less than 375 millimeters;

said expander for obtaining an expansion ratio of approximately 4×.

27. A beam expander as in claim 18, at least one lens element including a concave surface curvature; the expander for obtaining a maximum root mean squared wavefront error of lambda/16.1 over said wavelength range, where lambda is a selected wavelength of radiation within said pre-determined wavelength range and passing through said expander.

28. A beam expander as in claim 18, at least one lens element including a concave surface curvature; the expander for obtaining an average root-mean-square wavefront error less than or equal to lambda/33.2 over said wavelength range where lambda is a selected wavelength of radiation within said pre-determined wavelength range and passing through said expander.

29. A beam expander as in claim 18, at least one lens element including a concave surface curvature; the expander for obtaining a maximum wavefront error less than or equal to lambda/4.7 over said wavelength range, where lambda is a selected wavelength of radiation within said pre-determined wavelength range and passing through said expander.

30. A beam expander as in claim 18, at least one lens element including a concave surface curvature; the expander for obtaining an average Strehl ratio of at least 0.95 over said pre-determined wavelength range.

31. A beam expander as in claim 1, said crystal material substantially consisting of potassium bromide;

said liquid material substantially consisting of a siloxane.

32. A beam expander as in claim 31 for a selected wavelength range extending from 0.30 to 1.5 microns;

each of the lens elements having selected surface curvatures for cooperatively expanding a beam within the selected wavelength range;

said expander not requiring refocussing over said wavelength range.

33. A beam expander as in claim 31, said pre-determined distance less than 275 millimeters;

said expander obtaining an expansion ratio of approximately 5×.

34. A beam expander as in claim 31, at least one lens element including a concave surface curvature; the expander for obtaining a maximum wavefront error of lambda/12.5 over said wavelength range, where lambda is a selected wavelength of radiation within said pre-determined wavelength range and passing through said expander.

35. A beam expander as in claim 31, at least one lens element including a concave surface curvature; the expander for obtaining an average root-mean-square wavefront error less than or equal to lambda/19.9 over said wavelength range, where lambda is a selected wavelength of radiation within said pre-determined wavelength range and passing through said expander.

36. A beam expander as in claim 31, at least one lens element including a concave surface curvature; the expander for obtaining a maximum wavefront error less than or equal to lambda/3.6 over said wavelength range, where lambda is a selected wavelength of radiation within said pre-determined wavelength range and passing through said expander.

37. A beam expander as in claim 31, at least one lens element including a concave surface curvature; the expander for obtaining an average Strehl ratio of at least 0.89 over said pre-determined wavelength range.

38. A beam expander as in claim 1, said crystal material substantially consisting of potassium bromide;

said liquid material substantially consisting of a perfluorocarbon.

39. A beam expander as in claim 38 for a selected wavelength range extending from 0.24 to 2.5 microns;

each of the lens elements having selected surface curvatures for cooperatively expanding a beam within the selected wavelength range;

said expander not requiring refocussing over said wavelength range.

40. A beam expander as in claim 38, said pre-determined distance less than 375 millimeters;

said expander obtaining an expansion ratio of approximately 5×.

41. A beam expander as in claim 38, at least one lens element including a concave surface curvature; the expander for obtaining a maximum root-mean-square wavefront error of lambda/9.6 over said wavelength range, where lambda is a selected wavelength of radiation within said pre-determined wavelength range and passing through said expander.

42. A beam expander as in claim 38, at least one lens element including a concave surface curvature; the expander for obtaining an average root-mean-square wavefront error less than or equal to lambda/18.8 over said wavelength range, where lambda is a selected wavelength of radiation within said pre-determined wavelength range and passing through said expander.

43. A beam expander as in claim 38, at least one lens element including a concave surface curvature; the expander for obtaining a maximum wavefront error less than or equal to lambda/4.4 over said wavelength range, where lambda is a selected wavelength of radiation within said pre-determined wavelength range and passing through said expander.

44. A beam expander as in claim 38, at least one lens element including a concave surface curvature; the expander for obtaining an average Strehl ratio of at least 0.88 over said pre-determined wavelength range.

45. A beam expander as in claim 1, at least one lens element including a concave surface curvature; the expander for obtaining a doublet lens, said doublet lens including said fourth lens element and a fifth lens element;

said fifth lens element providing negative lens power.

* * * * *